United States Patent [19]

Higuchi et al.

[11] Patent Number: 5,708,514
[45] Date of Patent: Jan. 13, 1998

[54] ERROR DIFFUSION METHOD IN A MULTI-LEVEL IMAGE RECORDING APPARATUS UTILIZING ADJACENT-PIXEL CHARACTERISTICS

[75] Inventors: Kazuhiko Higuchi, Kawasaki; Hidekazu Sekizawa, Yokohama; Naofumi Yamamoto, Tokyo; Haruko Kawakami; Eiichi Sakaue, both of Yokohama, all of Japan

[73] Assignee: Kabushiki Kaisha Toshiba, Kawasaki, Japan

[21] Appl. No.: 521,323

[22] Filed: Aug. 30, 1995

[30] Foreign Application Priority Data

Aug. 31, 1994 [JP] Japan ................... 6-207770

[51] Int. Cl.⁶ .................... H04N 1/40; H04N 1/407
[52] U.S. Cl. .................... 358/458; 358/298; 358/406; 358/455; 358/456
[58] Field of Search .................... 358/455–461, 358/296, 298, 448, 406, 504, 518

[56] References Cited

U.S. PATENT DOCUMENTS

| 5,497,180 | 3/1996 | Kawakami et al. | 347/131 |
|---|---|---|---|
| 5,499,111 | 3/1996 | Sato et al. | 358/455 |
| 5,543,885 | 8/1996 | Yamada et al. | 358/455 |
| 5,550,647 | 8/1996 | Koike | 358/456 |
| 5,553,166 | 9/1996 | Kakutani | 358/457 |
| 5,555,095 | 9/1996 | Inuzaka et al. | 358/298 |
| 5,570,461 | 10/1996 | Yokomizo | 395/135 |
| 5,627,659 | 5/1997 | Kakutani | 358/443 |
| 5,638,188 | 6/1997 | Moro et al. | 358/456 |

FOREIGN PATENT DOCUMENTS

| 1-1156070 | 6/1989 | Japan . |
|---|---|---|
| 3-227178 | 10/1991 | Japan . |

Primary Examiner—Peter S. Wong
Assistant Examiner—Derek J. Jardieu
Attorney, Agent, or Firm—Oblon, Spivak, McClelland, Maier & Neustadt, P.C.

[57] ABSTRACT

An image recording apparatus according to the present invention is characterized by comprising first signal conversion section for converting a pixel density value of an current pixel of an input image signal into a first recording control signal for defining a recording amount, second signal conversion section for referring to an adjacent-pixel recording control signal for defining a recording amount of at least one adjacent pixel connected to the current pixel to convert the first recording control signal into a second recording control signal, being closest to the first recording control signal, for defining a recording amount at which pixel formation for the current pixel is stabilized, recording section for recording an image based on the second recording control signal, and error diffusion section for diffusing an error between the pixel density value and a recording density value of the second recording control signal to a pixel density value of each of non-processed pixels located around the current pixel.

16 Claims, 20 Drawing Sheets

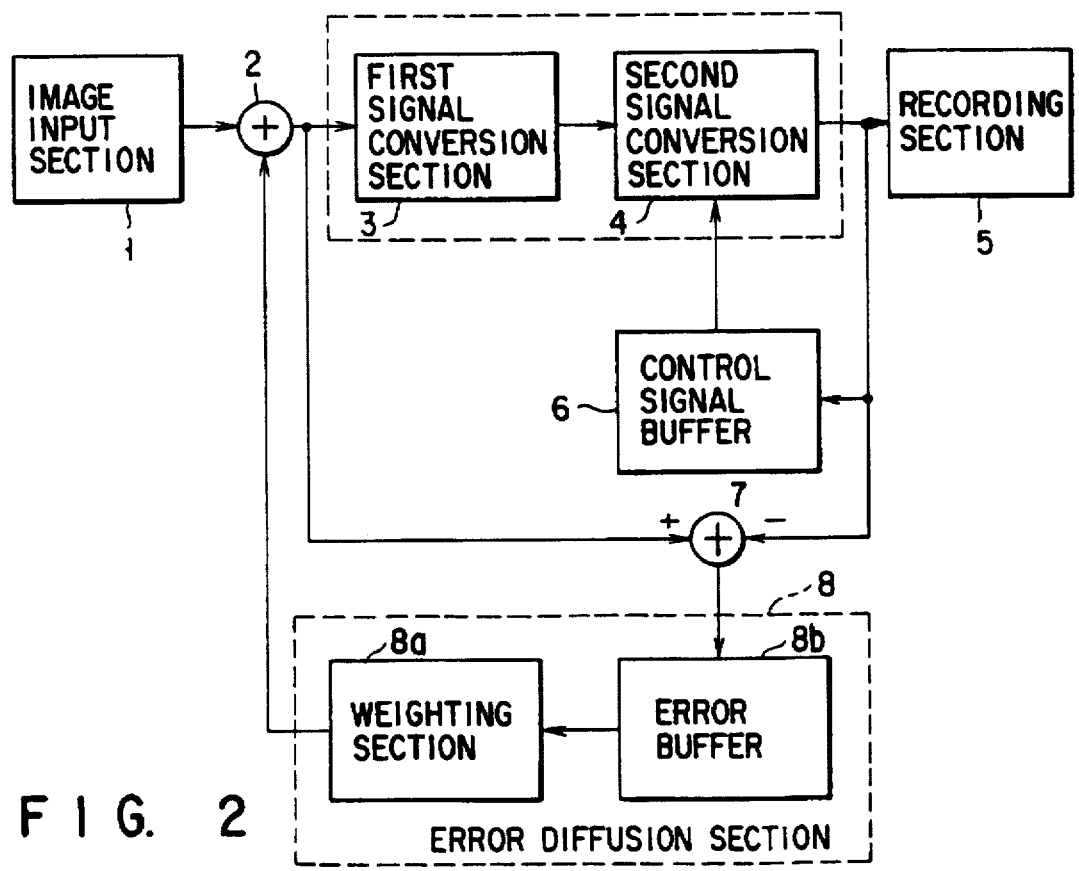
F I G. 2

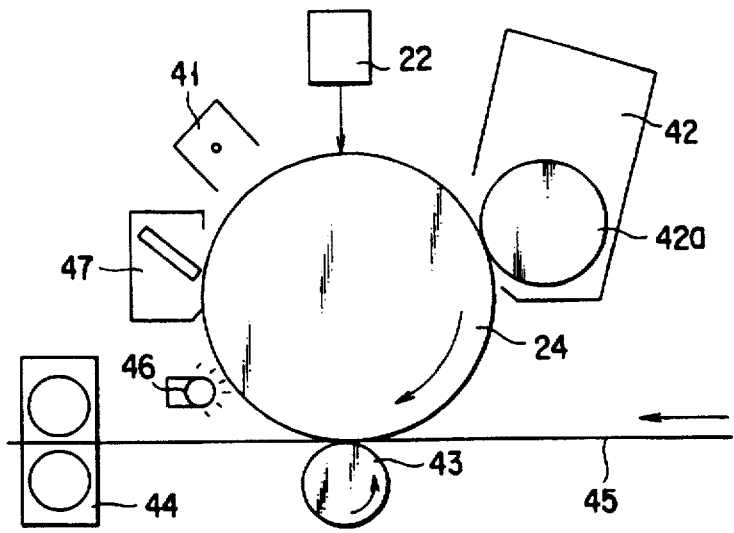
F I G. 3
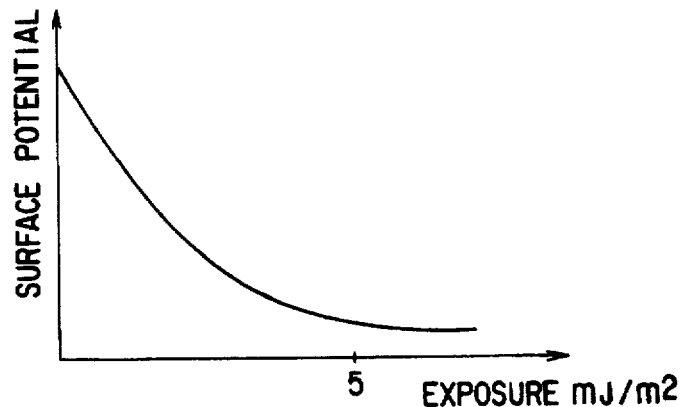
F I G. 4
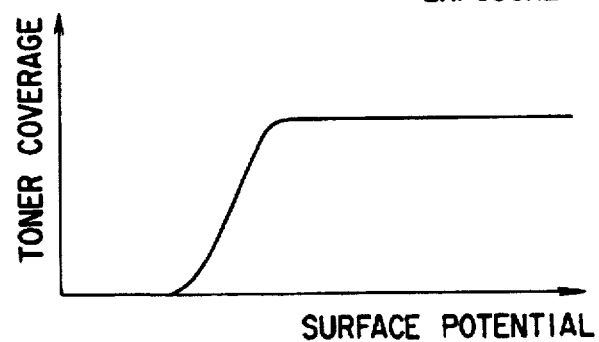
F I G. 5
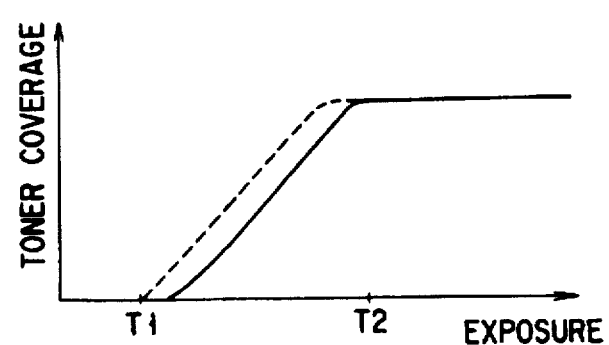
F I G. 6

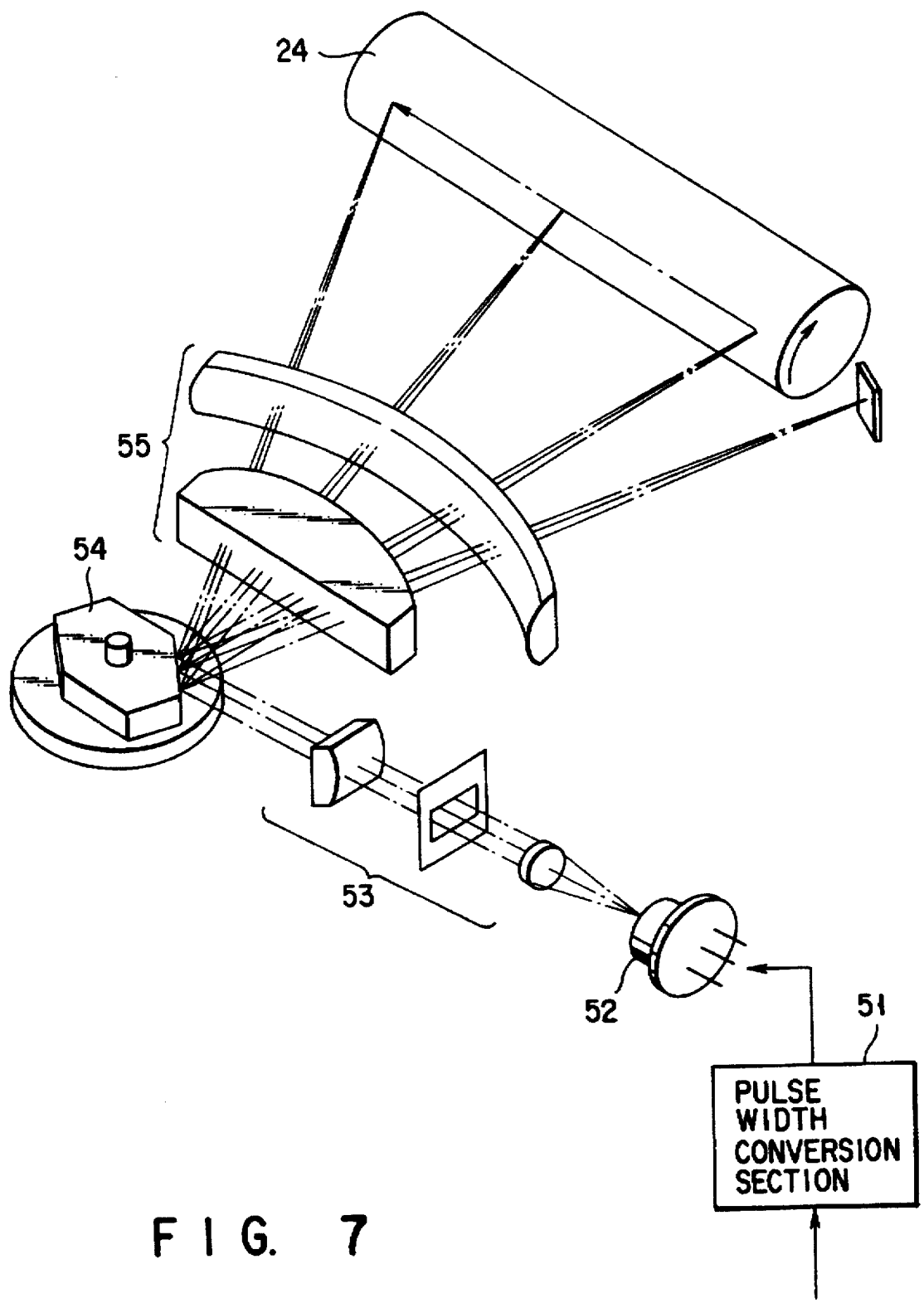
F I G. 7

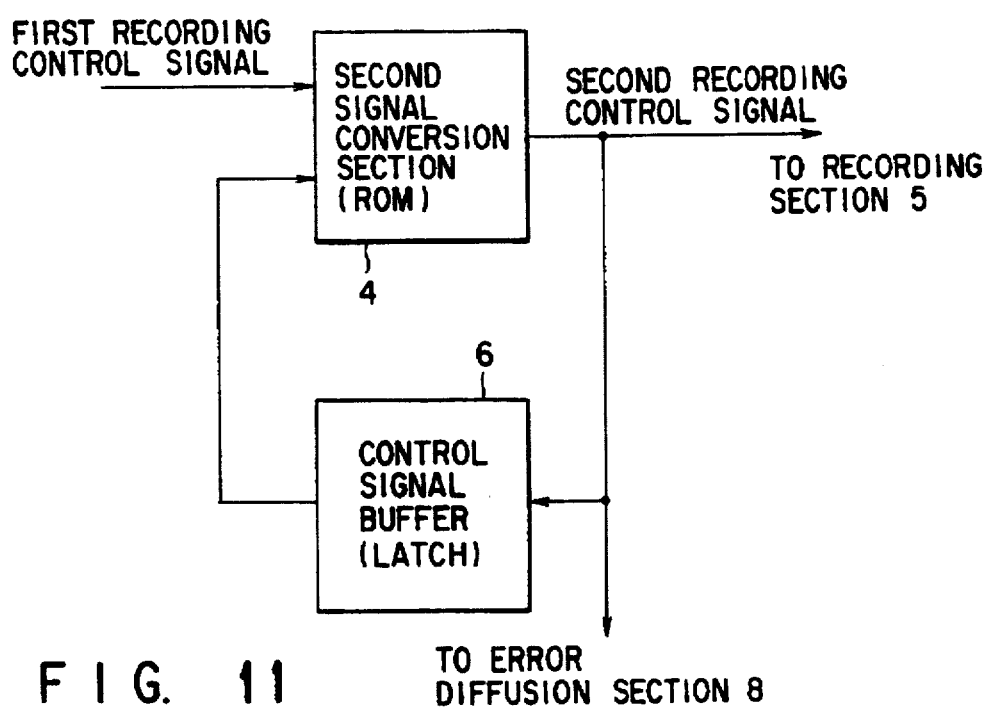
| PIXEL DENSITY VALUE | OUTPUT VALUE |
|---|---|
| 0 ⋮ 50 | 0 ⋮ 0 |
| 51 ⋮ 101 | 1 ⋮ 1 |
| 102 ⋮ 152 | 2 ⋮ 2 |
| 153 ⋮ 203 | 3 ⋮ 3 |
| 204 ⋮ 255 | 4 ⋮ 4 |
F I G. 10
F I G. 11

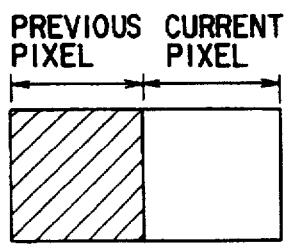
FIG. 12
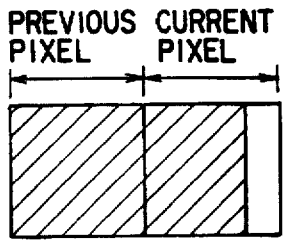
FIG. 14
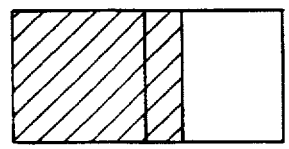
FIG. 13A
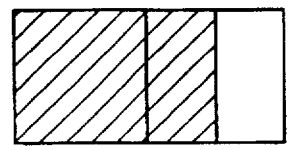
FIG. 13B
FIG. 13C
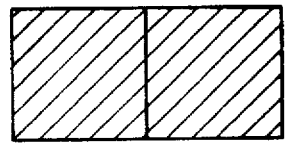
FIG. 13D
FIG. 13E
FIG. 15

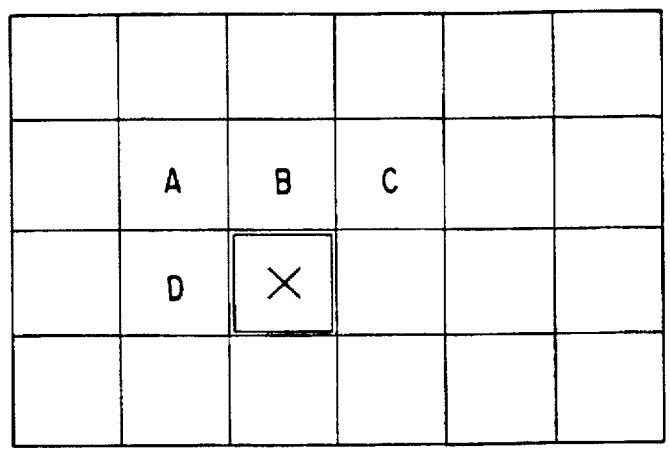
F I G. 16
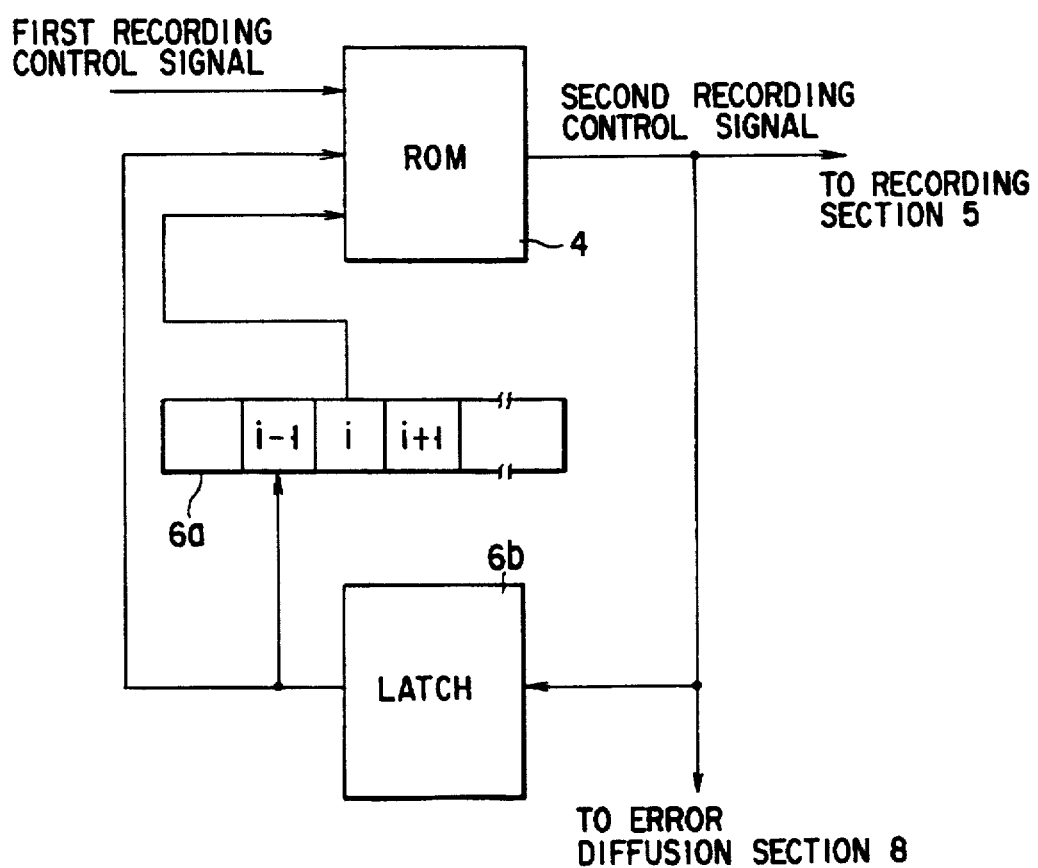
F I G. 17

FIG. 24

| PIXEL DENSITY VALUE | PIXEL POSITION | | OUTPUT | | PIXEL POSITION | | OUTPUT | |
|---|---|---|---|---|---|---|---|---|
| | Y | X | WIDTH | POSITION | Y | X | WIDTH | POSITION |
| 0 | ODD | — | 0 | 1 | EVEN | — | 0 | 4 |
| 1 | | | 0 → | | | | 0 → | 4 → |
| 51 | | | 1 → | | | | 1 → | 4 → |
| 102 | | | 2 → | | | | 2 → | 3 → |
| 153 | | | 3 → | | | | 3 → | 2 → |
| 204 | | | 4 → | | | | 4 → | 1 → |
| 255 | ODD | — | 4 | 1 | EVEN | — | 4 | 1 |

FIG. 26

| PIXEL DENSITY VALUE | PIXEL POSITION | | OUTPUT | | PIXEL POSITION | | OUTPUT | | PIXEL POSITION | | OUTPUT | | PIXEL POSITION | | OUTPUT | |
|---|---|---|---|---|---|---|---|---|---|---|---|---|---|---|---|---|
| | Y | X | WIDTH | POSITION | Y | X | WIDTH | POSITION | Y | X | WIDTH | POSITION | Y | X | WIDTH | POSITION |
| 0 | ODD | ODD | 0 | 1 | ODD | EVEN | 0 | 1 | EVEN | ODD | 0 | 4 | EVEN | EVEN | 0 | 4 |
| 1 | | | 0 | | | | 0 | | | | 0 | 4 | | | 0 | 4 |
| 31 | | | 1 | | | | 0 | | | | 1 | 4 | | | 0 | 4 |
| 63 | | | 2 | | | | 0 | | | | 2 | 4 | | | 0 | 4 |
| 127 | | | 3 | | | | 1 | | | | 3 | 3 | | | 1 | 4 |
| 159 | | | 4 | | | | 2 | | | | 4 | 2 | | | 2 | 3 |
| 191 | | | 4 | | | | 3 | | | | 4 | 1 | | | 3 | 2 |
| 223 | | | 4 | | | | 4 | | | | 4 | 1 | | | 4 | 1 |
| 255 | ODD | ODD | 4 | 1 | ODD | EVEN | 4 | 1 | EVEN | ODD | 4 | 1 | EVEN | EVEN | 4 | 1 |

MEANING OF INPUT VALUE p = 0 (WHITE)  1 (HALF-TONE) , 2 (SOLID)

MEANING OF OUTPUT VALUE d = 0 (UNCHANGE), 1 (FRONT STANDARD)
              2 (REAR STANDARD)

---

WHEN p3 = 0 OR 2    d = 0

---

WHEN p3 = 1

| p1 | p2 | p4 | p5 | d |
|----|----|----|----|----|
| –  | 0  | 2  | –  | 2 | ← a
| –  | 2  | 0  | –  | 1 | ← b
| 0  | 0  | 1  | 0  | 2 | ← c
| 0  | 1  | 0  | 0  | 1 | ← d

ASSEMBLY OF p1, p2, p4, p5 EXCEPT ABOVE CASE IS d = 0

FOR EXAMPLE

| p1 | p2 | p4 | p5 | d |
|----|----|----|----|----|
| –  | 1  | 2  | –  | 0 |
| –  | 2  | 1  | –  | 0 |
| –  | 2  | 2  | –  | 0 |
| –  | 1  | 1  | –  | 0 |

ETC.

F I G. 32

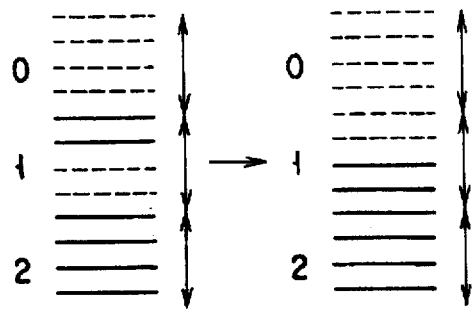 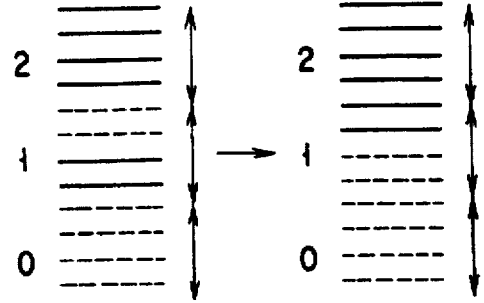
FIG.33A  FIG.33B  FIG.33C  FIG.33D
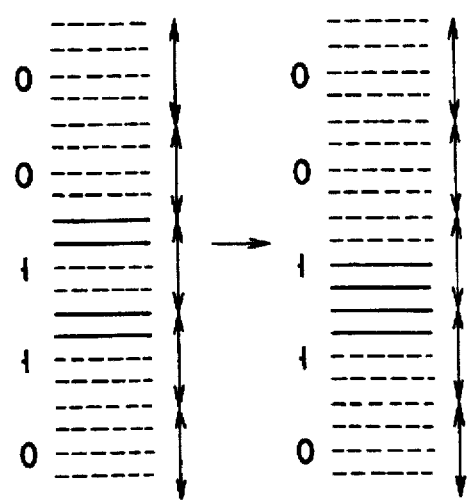 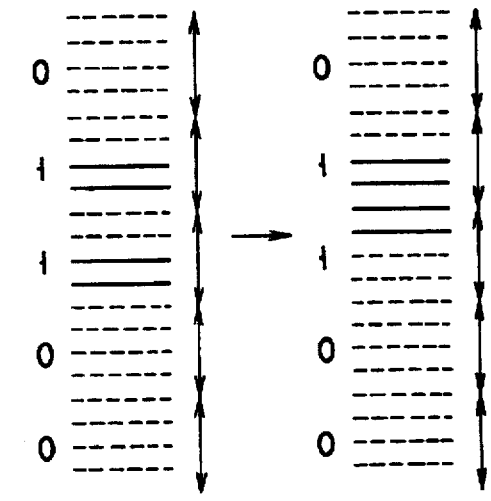
FIG.33E  FIG.33F  FIG.33G  FIG.33H

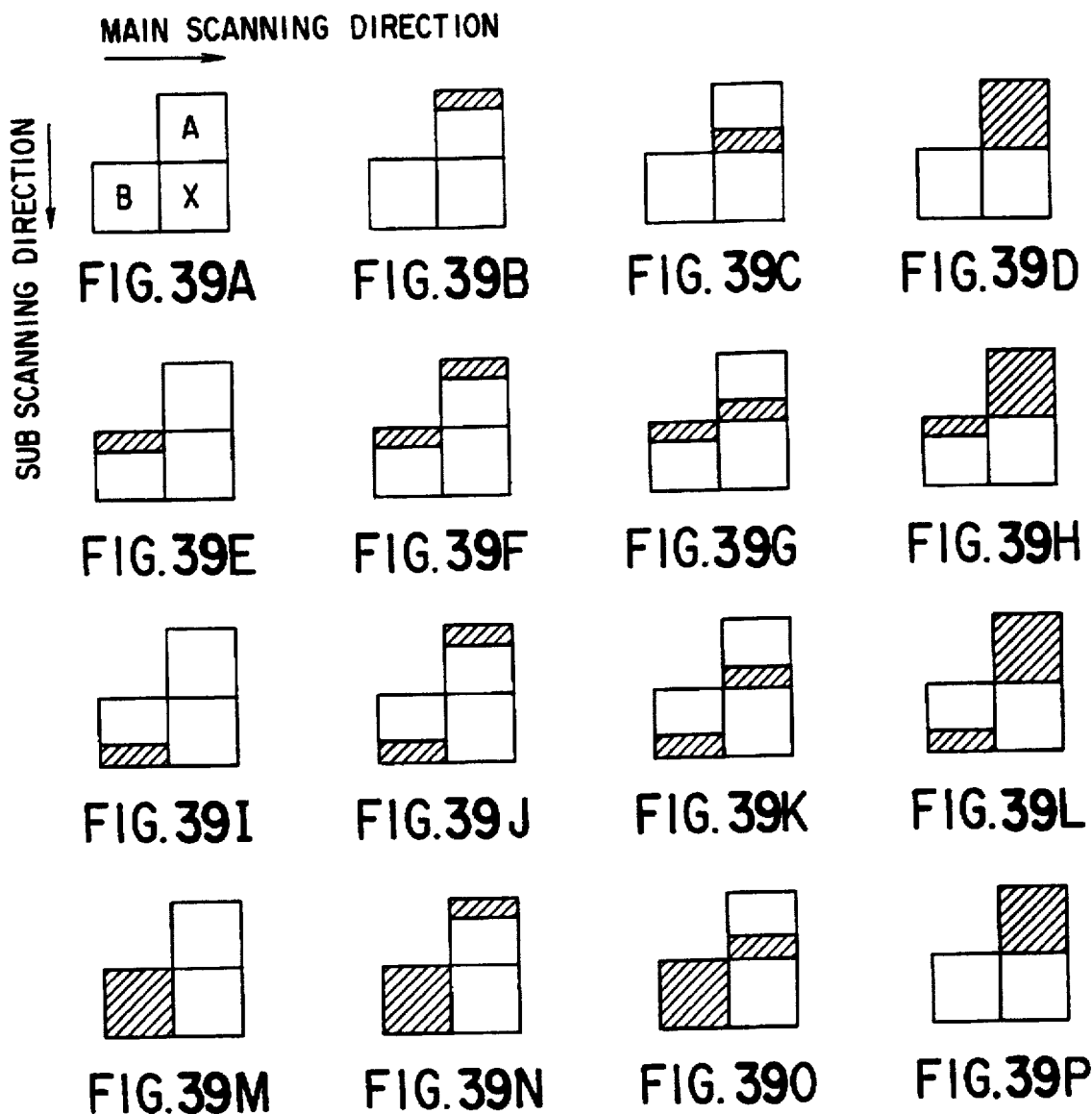
FIG.39A FIG.39B FIG.39C FIG.39D
FIG.39E FIG.39F FIG.39G FIG.39H
FIG.39I FIG.39J FIG.39K FIG.39L
FIG.39M FIG.39N FIG.39O FIG.39P
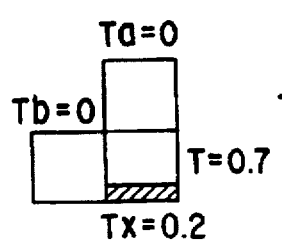
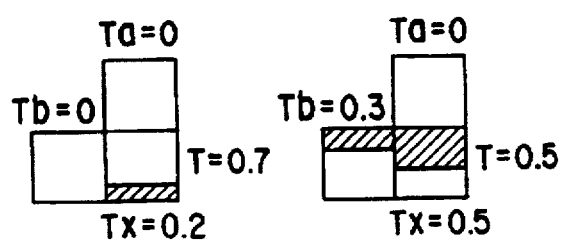
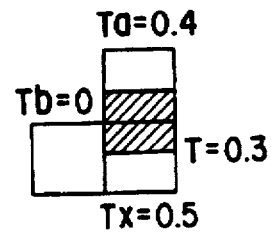
FIG.40A  FIG.40B  FIG.40C

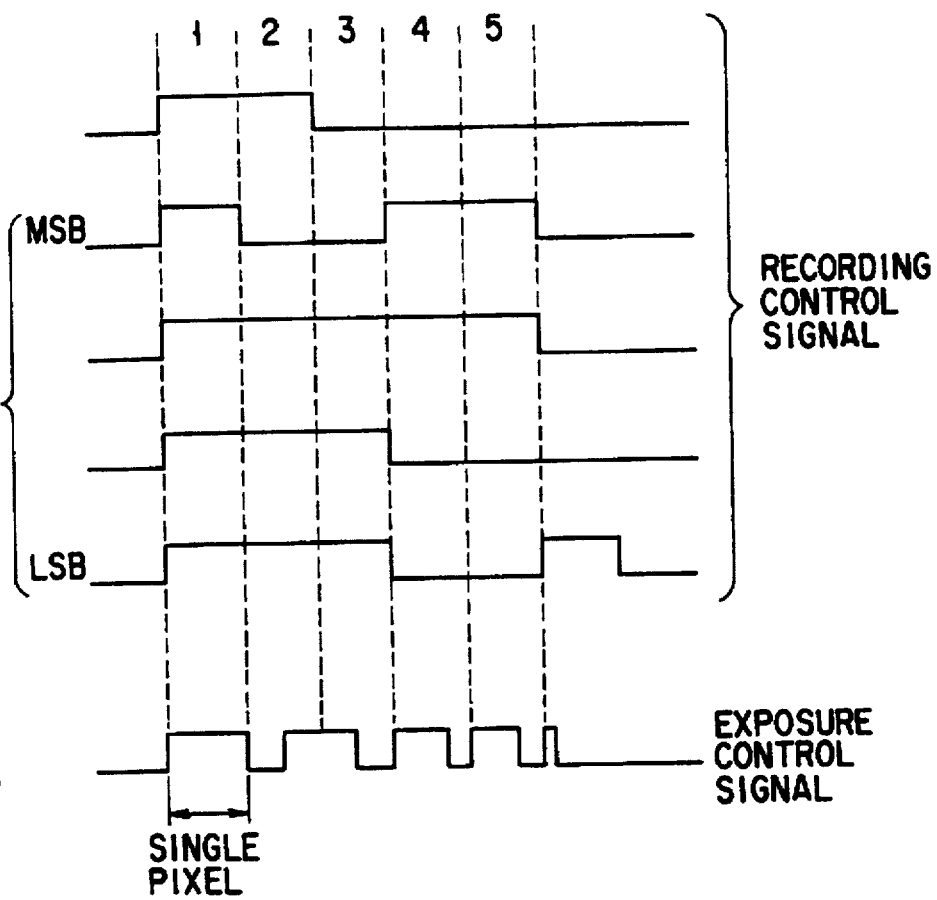
FIG. 42A
FIG. 42B
FIG. 42C
FIG. 43A
FIG. 43B
FIG. 43C

ERROR DIFFUSION METHOD IN A MULTI-LEVEL IMAGE RECORDING APPARATUS UTILIZING ADJACENT-PIXEL CHARACTERISTICS

BACKGROUND OF THE INVENTION

1. Field of the Invention

The present invention relates to an image recording apparatus for recording a tone image by an electrophotographic recording method or the like.

2. Description of the Related Art

As a typical image recording apparatus for recording a tone image (half-tone image) as a hard copy, an electrophotographic printer is popularly used. In a printer of this type, a photoreceptor surface is scanned by a light source such as a solid state emission element array or a laser to form an electrostatic latent image on the photoreceptor, and the latent image is developed with a charged toner, thereby forming an image.

In an electrophotographic printer, a bi-level recording method controls whether or not dots are formed on a recording paper. In general, the relationship between an exposure intensity and a recording density on a photoreceptor is nonlinear and has a large gamma value, and the recording density is largely changed by a small change in intensity of irradiated light. For this reason, the density of an image cannot be easily controlled by the intensity of a control signal. When an image having high and low densities, i.e., a tone image, is recorded by a bi-level recording printer, processing methods such as a dither and error diffusion are known. These methods use human sight characteristics in which a sensitivity is low at a high space frequency. According to these methods, when a rate of recording pixels in a plurality of pixels is controlled, an intermediate density can be expressed in accordance with the rate.

The dither method expresses a tone by using an image matrix, and can be advantageously realized by a relatively simple arrangement.

According to an error diffusion method, the input level of a single pixel is binarized to determine an input recording level, and only an error between the input recording level and the rate of recording is distributed to a peripheral image processing device (printer) to determine a density of a recording image, and thereby obtaining an image having a continuous tone.

In addition, a multi-level error diffusion method obtained by extending the error diffusion method to multi-level recording is proposed.

The dither method can stably perform tone expression. However, in the dither method, repetition patterns each having a long period conspicuously appear on a recording image because recording is basically performed using pixels of equal tone levels as one unit. On the other hand, in the error diffusion method, although a pattern appearing on a recording image theoretically has a short period, a special chains-like pattern is formed that hinders image quality. In order to solve the problem of the error diffusion method, a technique for adding a periodic signal to an image signal to make the special pattern imperceptible is known.

In another method, a dither signal serving as a periodic signal is added to an image signal to reduce generation of the special pattern, and then a type of the image signal is identified, and image processing is utilized for subtracting the added of a dither signal, resulting in an image which must be a sharp image.

However, in any one of these methods, a decrease in resolution is caused by adding a periodic signal, especially, for half-tone images.

In error diffusion recording, a method is known in which texture noise generated by formation of a special pattern is reduced by multi-level or bi-level recording. More specifically, texture noise is reduced in recording of a multi-level printer by tone processing called a re-alignment CAPIX using an algorithm similar to error diffusion. However, this method is not easily applied to recording methods not suitable for multi-level recording like an electrophotographic method. More specifically, in electrophotographic recording, recording at a low density level is easily influenced by a temperature and humidity, and a stable density level cannot be kept with respect to a change in environment or deterioration with time. As a result, an image having a large change in density is disadvantageously formed.

The following technique is also known. That is, switching between binarizing processing, at a threshold voltage obtained by a random number, and binarizing processing using a dither matrix to improve image quality at a low density. However, low density areas are randomly coarsened, and a dither pattern is conspicuous in an area having an intermediate or or greater level of density. In addition, unnatural boundaries between the low-density and intermediate-density are disadvantageously conspicuous.

A technique in which half-tone reproduction is improved using a checkered pattern formed by performing multi-level control on every dot is known. However, in this technique, a pulse width must be very finely controlled to obtain satisfactory tone quality, and stable tones are not easily reproduced under changing environmental conditions.

In another known technique, a degree of priority is added to each of a plurality of pixels in an image block, and tone processing is performed such that a pixel having the next degree of priority begins to be grown even while a pixel having a certain degree of priority is kept grown, thereby increasing a resistance to collapse of the pixels. According to this method, since processing is performed every block, a resolution is easily decreased, and the stability of a recording system must be sufficient to obtain a sufficient number of tone levels (e.g., 64 tone levels). Therefore, performance which cannot be obtained in the recording system is required.

In addition, in recent years, a pulse width modulation method has been proposed in which the a pulse width of a recording control signal supplied to a recording section is modulated to express tone. According to this method, a single pixel is divided into a plurality of areas, tone is expressed in accordance with the number of areas used in recording, i.e., the rate of recording areas in a single pixel. In this method, a space frequency of a pattern becomes sufficiently high, and a pattern having high and low densities is rarely conspicuous.

In contrast to this, a low-density portion is conspicuously coarsened, and a change in density is large in the low-density portion. More specifically, a general light spot irradiated on a photoreceptor is a spot having a certain size, depending on the size of a light source itself, or a blur of an optical system. For this reason, as the pulse width of a recording control signal is decreased, the potential distribution of an electrostatic latent image on the photoreceptor becomes dull, and this recording is shifted from bi-level recording. For this reason, a development density is changed by a small change in environment, a coarse image is formed, and a change in density increases.

As described above, the following problems cannot be solved by conventional techniques.

An ideal image recording apparatus that expresses single pixels in a multi-level manner is not easily realized. When pixel recording is multi-leveled, unstable images are formed. However, multi-level error diffusion methods are better than bi-level error diffusion with regard to tone smoothness.

For example, when the recording system inconveniently form an image having only a small amount, an image is unstably formed in a highlight area, and the image easily has a lot of noise.

An electrophotographic recording system in which light recording access is performed by a semiconductor laser is exemplified as a recording system. It is known that a light output from the semiconductor laser changes depending on a change in environmental temperature. For this reason, especially, in a low-density area, a stable image cannot be easily formed, and an image having a large change in density is formed. Referring to FIGS. 1A and 1B, FIG. 1A is a graph showing the relationship between the driving pulse width in a scanning direction and a surface potential on a photoreceptor, and FIG. 1B shows the driving pulse width based on driving time of a laser beam. As shown in FIGS. 1A and 1B, a pulse width smaller than a predetermined pulse width is used, an unstable image is formed because a surface potential is at a level near a threshold voltage. More specifically, in pulse width modulation, a design density may not be obtained, because pixels are unstably formed, resulting in, an image having a lot of noise.

In addition, the sensitivity of a photoreceptor varies depending on a manufacturing state and deterioration with time. When multi-level recording in is more frequently performed with a light amount at an intermediate level than in bi-level recording, an unstable image is formed.

In addition, image formation is disturbed by factors such as mechanical vibration or the like caused by driving the photoreceptor, starting of a development roller, and conveyance driving of recording paper. With respect to this point, the stability of multi-level recording is lower than that of bi-level recording.

The above problems are not posed in only electrophotographic recording methods. Similar problems are posed in other recording methods as well.

In the techniques such as a dither or an error diffusion expressed by a recording system such as a conventional electrophotographic recording system unsuitable for multi-level recording, resolution decrease, or texture noise is disadvantageously generated by a special pattern. The problems of a decrease resolution and generated noise are solved with pulse width modulation because tone changes in units of smaller pixel sizes. However, especially in low-density areas, image coarseness and changes in density are disadvantageously conspicuous.

SUMMARY OF THE INVENTION

It is an object of the present invention to provide an image recording apparatus capable of stably recording a good tone image for a general image recording apparatus which records an image in a multi-level manner.

It is another object of the present invention to provide an image recording apparatus capable of recording a good tone image having high resolution and a low noise level and being free from a change in density and a coarse portion in a low-density area while using a recording system which is not suitable for multi-level recording.

An image recording apparatus according to the present invention, includes first signal conversion means for converting a pixel density value of an current pixel of an input image signal into a first recording control signal for defining a recording amount; second signal conversion means for referring to an adjacent-pixel recording control signal for defining a recording amount of at least one adjacent pixel (processed in advance and) connected to the current pixel to convert the first recording control signal into a second recording control signal, being closest to the first recording control signal, for defining a recording amount (consisting of a recording width and a recording position) at which pixel formation for the current pixel is stabilized; recording means for recording an image based on the second recording control signal; and error diffusion means for diffusing an error between the pixel density value and a recording density value of the second recording control signal (or a recording density value calculated based on the recording amount of the second recording control signal) to a pixel density value of each of non-processed pixels located around the current pixel. The second signal conversion means refers to the adjacent-pixel recording control signal of a previous pixel to the current pixel.

The image recording method of the present invention is includes the steps of converting a pixel density value of an current pixel of an input image signal into a first recording control signal for defining a recording amount; referring to an adjacent-pixel recording control signal for defining a recording amount of at least one adjacent pixel connected to the current pixel to convert the first recording control signal into a second recording control signal, being closest to the first recording control signal, for defining a recording amount at which pixel formation for the current pixel is stabilized; recording an image based on the second recording control signal; and diffusing an error between the pixel density value and a recording density value of the second recording control signal to a pixel density value of each of non-processed pixels located around the current pixel.

Another image recording apparatus according to the present invention, is includes signal conversion means for converting a pixel density value of an current pixel of an input image signal into a recording control signal; recording means for recording an image based on the recording control signal; and error diffusion means for diffusing an error between a recording density value and a pixel density value based on the recording control signal to a pixel density value of each of non-processed pixels located around the current pixel, wherein the signal conversion means converts the pixel density value of the current pixel into a recording control signal for defining a recording width and a recording position such that a recording pattern and a non-recording pattern corresponding to the current pixel and a peripheral pixel connected to the current pixel reach a predetermined continuous value. The image recording apparatus further comprises recording density estimate means for estimating a recording density in the recording means based on a recording control signal used in recording performed by the recording means to output a recording density estimate value.

In this case, a recording position is a position at which a color material such as toner is located at a specific position in a pixel which is formed in each processing unit. For example, in a laser printer, an irradiation position of a laser beam on a photoreceptor is controlled with respect to an area smaller than the pixel.

In the image recording apparatus according to the present invention, when an image is to be formed on an current pixel, the image formation states of peripheral pixels with respect to the current pixel are referred to, a recording width and a recording position in which a recording system can stably record an image are selected in continuous image formation. For this reason, an unstable image formation operation is not performed, and a smooth image having a low noise level can be recorded. Since an error between an ideal recording amount and an actual recording amount is propagated to the peripheral pixels, a macroscopic density can be kept, and a stable, good tone image can be obtained.

Still another image recording apparatus according to the present invention includes signal conversion means for converting a pixel density value of an current pixel of an input image signal into a recording control signal for defining a recording width and a recording position of the current pixel; recording means for recording an image based on the recording control signal; recording density estimate means for estimating a recording density in the recording means based on the recording control signal to output a recording density estimate value; and error diffusion means for diffusing an error between the pixel density value and the recording density estimate value to a pixel density value of each of pixels located around the current pixel. In addition, the apparatus further comprises image discrimination means for discriminating a type of the image signal based on the image signal or a signal obtained by quantizing the image signal; and change means for changing a recording position defined by the recording control signal based on a discrimination result of the image discrimination means.

Another image recording method of the present invention includes the steps of converting a pixel density value of an current pixel of an input image signal into a recording control signal for defining a recording width and a recording position of the current pixel; recording an image based on the recording control signal; estimating a recording density based on the recording control signal to output a recording density estimate value; and diffusing an error between the pixel density value and the recording density estimate value to a pixel density value of each of pixels located around the current pixel.

The signal conversion means, includes means for referring a recording control signal obtained by converting a pixel density value of a peripheral pixel around the current pixel to convert the pixel density value of the current pixel into the recording control signal.

In addition, the recording density estimate means includes means for referring to a recording control signal obtained by converting the pixel density value of the peripheral pixel around the current pixel to estimate a recording density of the current pixel.

As described above, according to the present invention, a pixel density value of an current pixel of an input image signal is converted into a recording control signal for defining the recording width and recording position of the current pixel, and the recording control signal is supplied to a recording section to record a tone image. Therefore, sizes of image dots are controlled in units each smaller than a single pixel, a multi-level tone image can be reproduced without increasing the size of a pattern on a recording image. In addition, when the recording position is controlled such that image dots are concentrically formed in a low-density area, a tone image free from a change in density and a coarse portion can be recorded. More specifically, a recording width in a single pixel is determined such that the pixel density value of an input image pixel is equal to a recording density value, and, at the same time, a recording position in a single pixel is controlled such that noise caused by a recording mechanism is reduced.

On the other hand, the recording density of an image dot which seems to be actually recorded from the recording control signal is estimated, an error between the recording density estimate value and the pixel density value of an image signal is calculated, and the resultant value is diffused to the peripheral pixels of an input image signal. In this manner, the density of a low-frequency component of the image is expressed by a plurality of pixels, but the high-frequency component is expressed using a single pixel as a unit. In addition, high-resolution recording is performed in an edge portion by controlling the recording position.

Depending on the type of an input image signal, part of a line image or the sharpness of a pattern can be improved by changing a recording position defined by a recording control signal.

In addition, when the pixel density value of a current pixel is converted into a recording control signal, each image dot of a recording image can be controlled to have a proper size by also referring to recording control signal of the peripheral pixels around the current pixel. For this reason, an image having low graininess can be recorded while density stability is kept high.

As described above, according to the present invention, pixels are stably formed, and an image having a low noise level can be obtained. Since multi-level recording control can be effectively performed, an image having improved tone reproduction properties can be obtained. In addition, recordings more stabilized than conventional recordings can be performed, and changes in image quality caused by a change in environmental conditions such as temperature and humidity, changes in image quality caused by the uneven sensitivity of a photoreceptor or the like, and changes in image quality caused by mechanical factors such as a power driving system connected to a photoreceptor and a developer used in a recording section can be reduced.

In addition, according to the present invention, a pixel density value of a current pixel of an input image signal is converted into a recording control signal for defining a recording width and recording position of the current pixel, and the recording control signal is supplied to a recording section, so that the image is recorded. An actual recording density is estimated based on the recording control signal, and the error between the recording density estimate value and the pixel density value is diffused to the input image signal, so that a high-resolution good tone image having a low noise level and being free from change in density and coarseness in a low-density areas can be recorded using a recording system which is not suitable for multi-level recording.

Depending on the type of an input image signal, part of a line image or the sharpness of a pattern can be improved by changing a recording position defined by the recording control signal.

In addition, when the pixel density value of a current pixel is converted into a recording control signal, each image dot of a recording image can be controlled to have a proper size by also referring to recording control signals of the peripheral pixels of the current pixel. For this reason, an image having low graininess can be recorded while density stability is kept high.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 2 is a block diagram showing the arrangement of an image recording apparatus according to an embodiment of the present invention;

FIG. 3 is a block diagram showing the schematic arrangement of a recording section;

FIG. 4 is a graph showing the relationship between exposure and surface potential of a photoreceptor drum;

FIG. 5 is a graph showing the relationship between surface potential and toner coverage of photoreceptor drum;

FIG. 6 is a graph showing a relationship between exposure and toner coverage of photoreceptor drum;

FIG. 7 is a schematic illustration of an exposure section;

FIG. 10 is a table stored in a ROM of the first signal conversion section;

FIG. 11 is a block diagram of a second signal conversion section and a control signal buffer;

FIG. 12 is a table stored in a ROM of the second signal conversion section;

FIGS. 13A to 13E are views showing a relationship between a recording control pattern and adjacent pixels;

FIG. 14 is another table stored in the ROM of the second signal conversion section;

FIG. 15 is still another table stored in the ROM of the second signal conversion section;

FIG. 16 is a view for explaining an error diffusion operation;

FIG. 17 is a block diagram showing another arrangement of the second signal conversion section and an adjacent-pixel control buffer;

FIG. 24 is a table stored in a ROM of the signal conversion section in FIG. 19;

FIG. 26 is another table stored in the ROM of the signal conversion section in FIG. 19;

FIG. 32 is a view showing a processing algorithm for changing a recording position based on the conditions of an edge portion in a ROM in FIG. 31;

FIGS. 33A to 33H are views for explaining a changing operation of the recording position in the third embodiment;

FIGS. 39A to 39P are views showing various recording patterns in the fourth embodiment;

FIGS. 40A to 40C are views showing specific recording patterns in the embodiment;

FIGS. 42A to 42C are timing charts for explaining the operations of a signal conversion section and a pulse width conversion section in FIG. 41; and FIGS. 43A to 43C are views showing the relationship between an exposure control signal in FIG. 41 and an exposure distribution on a photoreceptor drum.

DETAILED DESCRIPTION OF THE PREFERRED EMBODIMENTS

Figure 1:
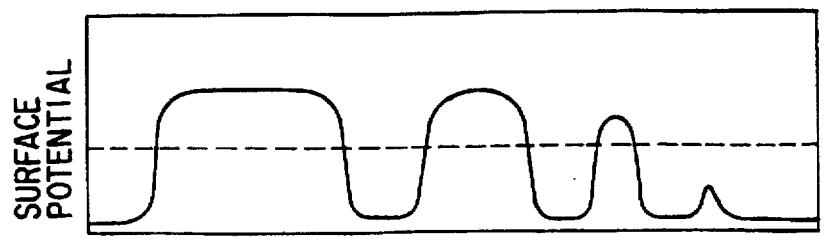
FIG. 1A is a graph showing a relationship between a driving pulse width in a scanning direction and surface potential of a photoreceptor.
FIG. 1B is a graph showing a driving pulse width based on driving time of a laser beam.
Figure 1:
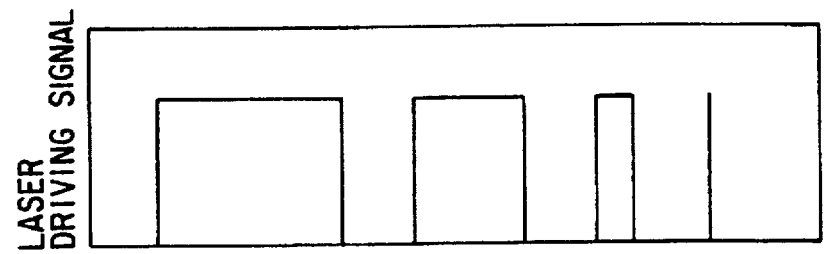

Embodiments of the present invention will be described below with reference to the accompanying drawings.

(First Embodiment)

FIG. 2 is a block diagram showing an image recording apparatus according to the first embodiment of the present invention.

Referring to FIG. 2, an image input section 1 (e.g., a scanner or an image memory) outputs an image signal of an half-tone image, i.e., outputs an image signal where each pixel has a multi-level pixel density value. This image signal is input to an adder 2. The adder 2 adds a correction density value to each pixel density value to output corrected pixel density values.

A first signal conversion section 3 converts corrected pixel density values output from the adder 2 into a first recording control signal capable of forming a pixel in a recording section 5 (to be described later), more specifically, into a first recording control signal for defining a recording amount such as recording width, recording position, or the like of the pixel to be recorded. Although a detailed method of determining the first recording control signal will be described later, the first recording control signal can be considered a provisional signal for recording an image in accordance with pixel density value and is input to a second signal conversion section 4.

The second, and conversion section 4 refers to recording control signals of peripheral pixels adjacent to an current pixel based on the first recording control signal for defining the recording amount, and outputs corrected recording control signals (second recording control signals) such that the recording section can form stable pixels. A method of determining the second recording control signals will be described later. The second recording control signals are input to the recording section 5, a control signal buffer 6, and a subtracter 7.

As the recording section 5, recording means using an electrophotographic method in which exposure scanning is performed on a photoreceptor with a laser beam to form an electrostatic latent image, and the latent image is developed with toner to obtain a recording image is used. In addition, the present invention can be applied to recording using another recording method, e.g., thermal recording or ink-jet recording for causing liquid ink to blow up. However, in this embodiment, the present invention will be described below based on recording means using an electrophotographic method.

The control signal buffer 6 is to temporarily hold the second recording control signals. The control signal buffer 6 includes a shift register, a line memory, and other devices to hold the second recording control signals for pixels adjacent to a current pixel, and outputs the recording control signal of the adjacent pixels corresponding to the current pixel to the second signal conversion section 4 in response to a timing control signal (not shown).

Of the second recording control signals, a signal representing a recording amount and corresponding to a recording width is input to the subtracter 7. This signal is subtracted from the correction density value output from the adder 2 to form an error signal. In this case, a value to be input to the subtracter 7 is normalized by a normalization circuit (not shown) to have a data width almost equal to that of a pixel density value input to the first signal conversion section 3. This error signal is input to an error diffusion section 8.

The error diffusion section 8 includes an error buffer 8a for temporarily storing the error signal and a weighting section 8b for multiplying the error signal read from the error buffer 8a by a predetermined weighting coefficient. The error diffusion section 8 supplies a result obtained by multiplying the error signal by the weighting coefficient to the adder 2 to perform error diffusion for an image signal from the image input section 1.

Of the above parts in FIG. 2, the functions of the image input section 1 and the recording section 5 will be described below in detail.

The image input section 1 outputs pixel density values of the bit map of a half-tone image stored in an image memory from raster scanning. In this case, the bit map is obtained by finely dividing an image into squares corresponding to pixels, and a pixel density value is stored in each square. The pixel density value is expressed as, e.g., an 8-bit/pixel (i.e., 256 tone levels) digital value. The pixel density values of the bit map are written in an image memory from, e.g., a host computer, by a handshake method. A CPU may be arranged in the recording apparatus such that information written from the host computer and expressed with a page description language is developed in the bit map.

FIG. 3 is a view showing the schematic arrangement of the recording section 5. As the recording section 5 in this embodiment, a recording section employing an electrophotographic method is exemplified.

In the recording section 5, a charger 41, an exposure section 22, a developer 42, a transfer roller 43, an eraser lamp 46, and a cleaner 47 are arranged around a photoreceptor drum 24. The photoreceptor drum 24 is rotated at a predetermined speed in the direction of an arrow in FIG. 3 based on a driving force transmitted from a motor (not shown) or the like. Since the arrangement and operation of each part can be understood with reference to the conventional electrophotographic printer, only the operation will be briefly described below.

Prior to image formation on recording paper 45, the photoreceptor drum 24 begins to be rotated. The surface of the photoreceptor drum 24 is uniformly charged by the charger 41. Light emission of a laser diode is controlled by a recording control signal generated by the exposure section 22 based on an image signal, and the laser diode performs exposure scanning on the charged photoreceptor drum 24.

This exposure scanning changes the surface potential of the photoreceptor drum 24 according to an amount of light irradiation, thereby forming an electrostatic latent image corresponding to the image signal.

FIG. 4 shows the relationship between the exposure and surface potential of the photoreceptor drum 24. A potential pattern (i.e., of an electrostatic latent image) is distributed on the photoreceptor drum 24 based on the recording control signal.

In the developer 42, with rotation of a development roller 42a is rotated and toner stored in the developer 42 adheres to the photoreceptor drum 24 in an amount according to the electrostatic latent image, thereby obtaining a visible image.

A relationship between the surface potential of the photoreceptor drum 24 and a toner coverage is shown in FIG. 5.

The recording paper 45 is conveyed between the transfer roller 43 and the photoreceptor drum 24 at a timing controlled by a convey mechanism (not shown), and the toner developed by the developer 42 is transferred to the recording paper 45. In addition, the recording paper 45 is conveyed to a fuser 44 constitutes a heat roller or other apparatus, and the toner is heated and pressed to be fixed on the recording paper 45, so that an image pattern corresponding to the image signal supplied to the exposure section 22 is obtained on the recording paper 45.

After fixing the developed toner on the recording paper 45, the photoreceptor drum 24 is erased by eraser lamp 46, the residual toner which is not transferred to the recording paper 45 is removed by the cleaner 47.

FIG. 6 shows the relationship between the exposure and toner coverage on the photoreceptor drum 24. The relationship changes depending on factors such as a charge amount and temperature. For example, the characteristics of the relationship could change from the characteristics represented by a solid line in FIG. 6 to the characteristics represented by a broken line in FIG. 6. In a small-exposure area (<T1) or large-exposure area (>T2), a change in toner amount caused by the factors is zero or small. However, in an intermediate-exposure area (T1 to T2), the toner coverage is easily influenced by the factors. Therefore, when an intermediate-exposure area (T1 to T2) is large, reproduction of a recording density becomes unstable. More specifically, these changes cause coarseness and a blurred density. The coarseness of the former degrades density reproduction (color reproduction in color printing), and the blurred density degrades image quality. For this reason, these changes are desirably minimized.

FIG. 7 is a view showing the schematic arrangement of the exposure section 22.

The arrangement of each element can be understood with reference to a conventional laser exposure system. A driving time of a laser diode 52 is modulated by a pulse width conversion section 51 in accordance with the recording control signal output from the signal conversion section. A tone image can be recorded by pulse width modulation. A light beam from the laser diode 52 driven in accordance with the modulated signal travels through a condensing lens 53 including a collimator lens, a slit, and a cylinder lens, is polarized by a polygon mirror 54, polarized light beam is irradiated on the photoreceptor drum 24 through a f-θ lens serving as an imaging optical system 55 to perform exposure scanning on the photoreceptor drum 24.

The operation of each part will be described below with reference to processing procedures.

Figure 8:
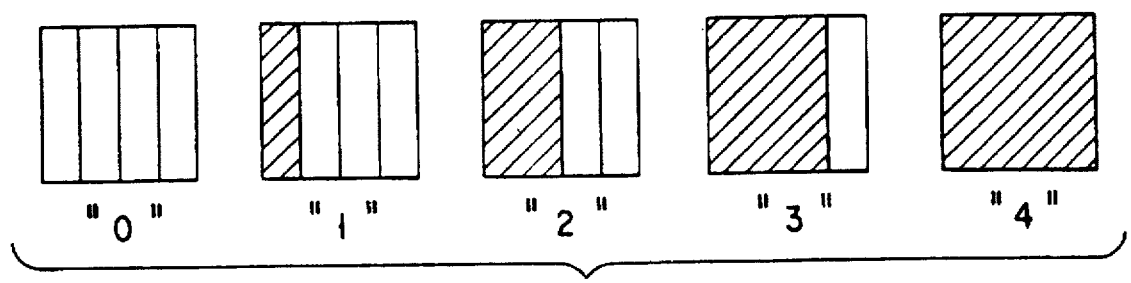
FIG. 8 is a sequence of views illustrating various recording control patterns.
Figure 9:
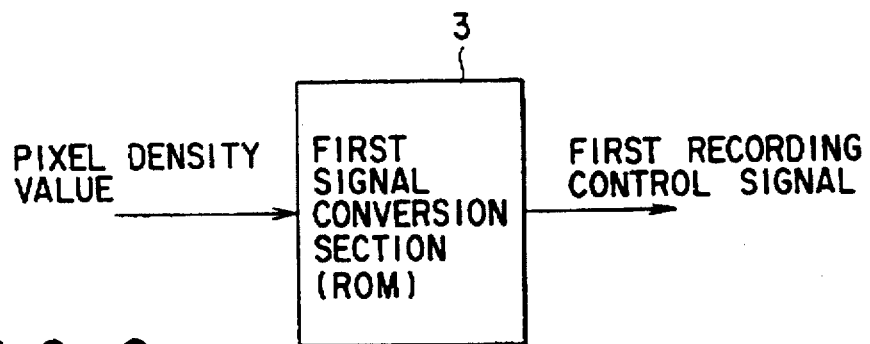
FIG. 9 is a block diagram showing an arrangement of a first signal conversion section.

The pixel density value of an current pixel input to the first signal conversion section 3 is converted into a first recording control signal suitable for recording in the recording section 5 in accordance with the density value. For example, a case wherein the recording section 5 performs recording with five values from 0 to 4 will be described below. The first recording control signals obtained by converting input pixel density values of 256 tone levels into any one of five output levels as shown in FIG. 8. This conversion can be realized by a quantizing operation at equal intervals. FIG. 9 is a block diagram illustrating input and output of the first signal conversion section 3. The first signal conversion section 3, as shown in FIG. 9, can be realized by a lookup table using a ROM or the like The lookup table stored in first signal conversion section 3, for example, is shown in FIG. 10.

The second signal conversion section 4 refers to an adjacent-pixel control signal of at least one peripheral pixel adjacent to the current pixel and converts the input first recording control signal into a second recording control signal which can be stably recorded on the current pixel. FIG. 11 is a block diagram showing an arrangement of the second signal conversion section 4 and the control signal buffer 6. The second signal conversion section 4 can be realized by a lookup table using a ROM like the first signal conversion section 3.

For example, when a pixel adjacent to the current pixel on the left side, i.e., a previous pixel, is used as the referred adjacent pixel, a second recording control signal to be output is determined with reference to a table shown in FIG. 12. More specifically, referring to FIG. 12, when the first recording control signal (current pixel) is "1" or "2", and the second recording control signal (previous pixel) corresponding to the previous pixel is one of "0", "1", "2", and "3", correction processing is performed. In this example, a recording pattern of "1" or "2" shown in FIG. 8 is selected, and since recording stability is insufficient when a small value such as about "1" or "2" is singly selected, correction processing avoids recording using this value. However, even if the recording control signal of the current pixel is "1" or "2", the recording pattern of a dual pixel is continuously formed as shown in FIGS. 13A to 13E when the recording control signal of the referred adjacent pixel is 4 and recording can be stably performed. In this case, no correction processing is performed, the first recording control signal corresponding to the current pixel is directly used as the second recording control signal.

In conversion of the first recording control signal into the second recording control signal, the value of a recording control signal which is closest to the value of the first recording control signal and can be stably recorded is selected. The reason why the value closest to the value of the first recording control signal is to obtain faithful tone reproduction by minimizing error between the input pixel density value and the recording density value for the current pixel. When instability in a recording system changes, a recording control signal capable of usually obtaining stable pixel formation is selected in consideration of an allowable range of change.

In this conversion, the size of a fine pixel in which unstable recording is performed may be calculated by an experiment in advance. Assume that a minimum recording control amount at which stable recording is performed is represented by Dstable and the pixel density value of the first recording control signal corresponding to the current pixel is represented by D1. In this case, when the following condition is satisfied:

D1<Dstable, correction processing is performed with reference to the pixel formation state between the current pixel and the adjacent pixels. In this correction processing, the first recording control is binarized by a threshold value of Dstable/2 to obtain a second recording control signal.

In this case, even if a value different from that of the original first recording control signal is selected, the second recording control signal serving as a final output is diffused to other pixels through the error diffusion section 8 using the difference between the recording density value and the input pixel density value as an error. For this reason, macroscopic density of the input pixel is maintained.

In addition, tables as shown in FIGS. 14 and 15 may be determined by experiment, and applied to this embodiment. The table in FIG. 14 shows a case wherein when the recording control signal of the previous pixel is "3", a fine pixel is stably recorded by a recording control signal of about "2" corresponding to the current pixel. In this case, the previous pixel and the current pixel do not supply a completely continuous pattern. However, in a pixel formation operation in the recording system, the continuity of the recording pattern is obtained when the pixel formation operation is totally considered, e.g., when it is considered that an exposure pattern formed by a laser beam is blurred to some extent. The table in FIG. 15 is to be applied to a recording system which is relatively unstable. More specifically, it is supposed that unstable pixel formation is performed when the recording pattern of about "3" shown in FIG. 8 is singly selected as the recording control signal of the current pixel.

As described above, although a method of converting the first recording control signal into the second recording control signal is selected from the above various methods, the scope of the present invention is to remove a recording control signal (in this case, the second recording control signal) for forming only an unstable fine pixel.

In this manner, an unstable fine pixel is not necessarily selected, and formation of a fine pixel is selected depending on a pixel formation state with reference to the pixel formation state between the current pixel and the peripheral pixels. For this reason, smooth tone characteristics can be maintained in intermediate and high density areas. In addition, since there is a control level which cannot be expressed in a highlight area, tone reproduction properties become poor. However, since a stable image having a low noise level can be obtained, image quality is improved as a whole.

In applying the reference table shown in FIG. 12 or 15, a bi-level signal representing whether the previous pixel is "4" or another value, i.e., information having 1 bit as a data amount, is to be used as the recording control signal of the previous pixel. Therefore, a control signal buffer 6 having a simple arrangement can be realized. More specifically, when the second recording control signal corresponding to the previous pixel of the current pixel is temporarily stored as the value of the adjacent pixel, the control signal buffer 6 can be realized with a 1-bit latch (see FIG. 11) or the like having a simple arrangement.

The function of the error diffusion section 8 will be described below in detail.

Error signals from the subtracter 7 are stored in the error buffer 8a constituted by a line memory. The error signals stored in the error buffer 8a are sequentially read out and input to the weighting section 8b, so that values obtained by respectively multiplying the error signal of the peripheral pixels (i.e., three pixels A, B, and C of a previous line and a previous pixel adjacent to a current pixel) of an current pixel X shown in FIG. 16 by weighting coefficients (Wa, Wb, Wc, and Wd) are obtained. As the weighting coefficients, for example, Wa=1/16, Wb=5/16, Wc=3/16, and Wd=7/16 are selected. As a simple example, the weighting coefficients having numerators which are powers of 2 i.e., Wa=2/16, Wb=4/16, Wc=2/16, and Wd=8/16. A circuit structure of the weighting section 8b is obtained by a bit shifter and an adder. In this manner, the signals respectively multiplied by the weighting coefficients are added to an input image signal by the adder 2, thereby diffusing a quantizing error during a recording operation.

In the above description, although the previous pixel of the current pixel is used as a peripheral pixel to be referred to, when the previous pixel and pixels (pixels located in the previous line with respect to the current pixel) of the previous line are referred to as the peripheral pixels to be referred to, finer control can be performed.

FIG. 17 is a block diagram showing the detailed arrangement of the second signal conversion section 4 and the control signal buffer 6.

The second signal conversion section 4 is constituted by a ROM 4, and the control signal buffer 6 is constituted by a line memory 6a corresponding to the number of pixels of one line and a latch 6b of a single pixel. That is, of the second recording control signals, a value representing a recording width as a typical recording amount, is input to the latch 6b. An ith pixel is set as the current pixel, the second recording control signal corresponding to a (i-1)th pixel is stored in the latch 6b. A value output from the latch 6b and the recording control signals of the pixels of the previous line stored at an ith address of the line memory 6a are simultaneously read out, and the value, the recording control signals, and the first recording control signal output from the first signal conversion section are simultaneously input to the ROM serving as the second signal conversion section 4. These data select an address of the ROM 4, the second recording control signal corresponding to this address is output. The output from the latch 6b is stored at the (i-1)th address of the line memory 6a, the same operation as described above is repeated to cause processing to advance.

In addition, an arrangement using an FIFO can be used in place of the line memory 6a. In this case, a control circuit for selecting an address of the line memory is advantageously unnecessary.

Figures 18, 19:
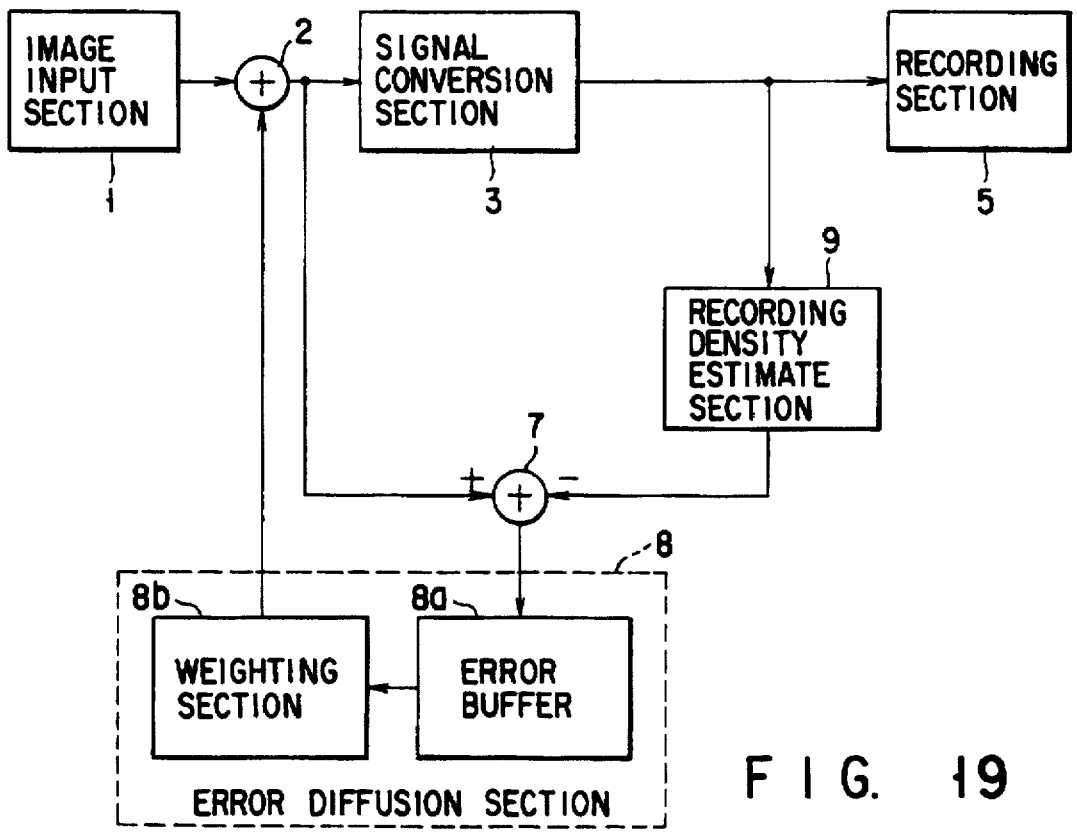
FIG. 18 is still another table stored in the ROM of the second signal conversion section.
FIG. 19 is a block diagram of an image recording apparatus according to a second embodiment of the present invention.

FIG. 18 is a reference table of a method of determining the second recording control signal with respect to the first recording control signal. When the previous pixel is one of "1" to "3" and the previous line is "0", pixel formation is unstable, and correction processing is performed. When the previous pixel is "4", or the previous line is "1" to "4", pixel formation is stable, and the first recording control signal is directly output as the second recording control signal. The reference tables are determined in consideration of the continuity between the previous pixel, the pixels of the previous line, and the current pixel or a degree of connection therebetween, and can be accurately determined by experiment performed in advance.

In the above description, the first recording control signal is output by the first signal conversion means, and the second recording control signal is obtained by the second signal conversion means. However, these operations can also be performed as a series of operations by single processing. More specifically, a circuit arrangement such as a ROM which is set such that a control signal from an adjacent-pixel is referred to in determining the second recording control signal for a pixel based on the input signal. In this case, a table for the ROM is determined according to the above description.

In the above description, the recording of five values, i.e., "0" to "4", is performed. However, the present invention is not limited to the number of values of the multi-level recording, and smooth tone reproduction properties can be realized as the number of values increases. When the present invention is applied to a conventional recording apparatus in which a large number of values cannot be set because unstable pixel formation must be avoided, a stable image having good tone reproduction properties with a large number of values can be advantageously recorded.

(Second Embodiment)

FIG. 19 is a block diagram showing an image recording apparatus according to the second embodiment. The same reference numerals as in the first embodiment denote the same parts in the second embodiment, and a description thereof will be omitted. According to the second embodiment, the control signal buffer 6 used in the first embodiment is not arranged, and a recording density estimate section 9 is arranged. Note that a signal conversion section has a signal conversion section 3 corresponding to the first signal conversion section 3 of the first embodiment.

An image input section 1 and an adder 2 in the second embodiment have the same functions of those of the first embodiment.

The signal conversion section 3 is a portion corresponding to the first signal conversion section 3 of the first embodiment. The signal conversion section 3 quantizes a pixel density value output from the adder 2 to convert the pixel density value into a recording control signal for defining recording amounts such as the recording width and recording position of a corresponding pixel. Although a detailed method is utilized for determining the recording control signal, the recording control signal is generally a signal for recording an input pixel density value, and the recording control signal is input to a recording section 5 and the recording density estimate section 9.

Since the function of the recording section 5 is the same as that of the first embodiment, a description thereof will be omitted.

The recording density estimate section 9 which is a characteristic feature of the second embodiment estimates an actual recording density in the recording section 5 based on the recording control signal output from the signal conversion section 3, and outputs a recording density estimate value as an estimate result. The recording density estimate value is input to a subtracter 7, the subtracter 7 subtracts the recording density estimate value from a correct density value output from the adder 2 to generate an error signal. This error signal is input to an error diffusion section 8.

This error diffusion section 8 is the same as that of the first embodiment.

The detailed functions of the parts in FIG. 19 will be described below.

Figure 20:
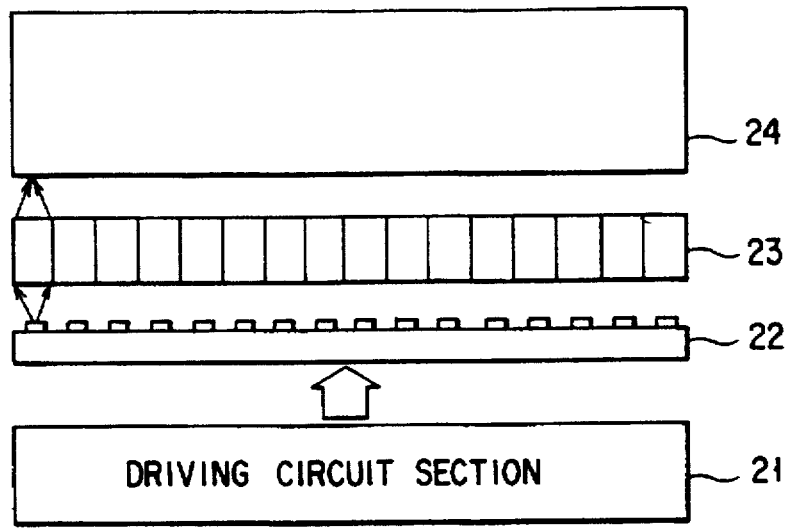
FIG. 20 is a block diagram of the recording section in FIG. 19.

FIG. 20 shows the arrangement of the recording section 5. In the first embodiment, a scanning type recording section is shown as the recording section 5. However, the recording section 5 of the second embodiment is an array type recording section.

The recording section 5 has an arrangement in which light from a solid state emission element array 22 driven by a driving circuit section 21 arranged in a main scanning direction, and is focused by a fiber lens array 23 on the photoreceptor drum 24 mechanically rotated in a sub-scanning direction. The driving circuit section 21 converts a time-series recording control signal input from the signal conversion section 3 into a signal for simultaneously driving the solid state emission elements of the solid state emission element array. The solid state emission element array 22 is arranged parallel to a rotating shaft of the photoreceptor drum 24 and close to a surface of the photoreceptor drum 24. The fiber lens array 23 is arranged between the solid state emission element array 22 and the photoreceptor drum 24 such that the emission surfaces of the emission elements form an image on the photo-receptor drum 24. In this manner, the light from the solid state emission element array 22 is irradiated on the photoreceptor drum 24 as exposure light, the surface of the photoreceptor drum 24 is exposed. As the solid state emission element array 22, an LED print head in which LEDs are arranged in a line or elements using emission of a phosphor material can be used.

Figure 21:
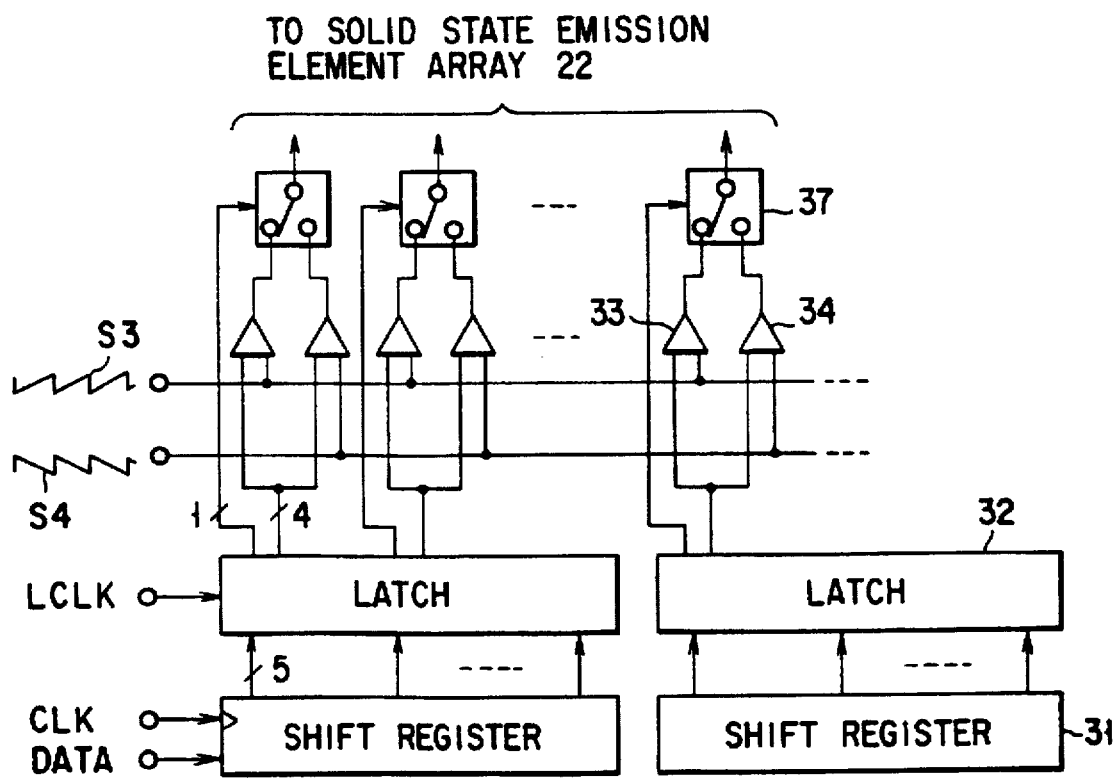
FIG. 21 is a block diagram of the driving circuit section in FIG. 20.

FIG. 21 shows the arrangement of the driving circuit section 21 for the solid state emission element array 22.

Recording control signals from the signal conversion section 3 are sequentially written in the shift register 31 in units of lines. The shift register 31 is constituted by a plurality of 5-bit parallel shift registers which are vertically connected to each other. The contents of the shift register 31 are parallel output to latches 32. Note that, in this embodiment, each of the shift register 31 and the latch 32 is constituted by a plurality of IC chips which are vertically connected to each other.

The data of the recording control signals latched by the latch 32, is 4-bits representing a recording width, and (exposure pulse width) is compared with two triangle wave signals S3 and S4 having different polarities in two comparators 33 and 34, respectively. One of signals output from the comparators 33 and 34 is selected by a selector 37, the selected signal is used as a driving signal for a corresponding element of the solid state emission element array 22. The selector 37 one of the outputs from the comparators 33 and 34 under is controlled by 1 data bit representing a recording position (exposure pulse start timing) of the recording control signal latched by the latch 32.

In this manner, each emission element of the solid state emission element array 22 is controlled to emit light at an exposure pulse start timing defined by the recording position data of the recording control signals and for an emission time (corresponding to an exposure pulse width) defined by the recording width data of the recording control signals.

The signal conversion section 3 will be described below in detail.

In the recording section 5, the emission time (exposure pulse width) of the solid state emission element array 22 is controlled in accordance with sub-scanning (rotation of the photoreceptor drum 24) to change a recording width in a sub-scanning direction in a single pixel, thereby changing a recording density. In addition, the emission timing (exposure pulse start timing) of the solid state emission element array 22 is controlled to change a recording position, so that a tone image having a stable density can be recorded.

The signal conversion section 3 converts the pixel density value of an image signal input from the adder 2 into a recording control signal for defining a recording width and a recording position in the recording section 5, i.e., information representing the exposure pulse width and exposure pulse start timing of each pixel in the solid state emission element array 22.

The operation of the signal conversion section 3 will be described below in detail.

The signal conversion section 3 has two functions which are roughly classified. The first function is to express a recording density having, e.g., 256 tone levels, by a recording control signal limited to several levels. The second function is to prevent the size of connected image dots in a toner image formed on the photoreceptor drum 24 from being excessively small.

A mechanism of expressing a 256-tone recording density will be described first.

In the second embodiment, the recording density is controlled by the size of a latent image distribution on the photoreceptor drum 24, i.e., the pulse width (exposure pulse width) of exposure light irradiated on the photoreceptor drum 24. However, an exposure pulse width for recording a single pixel is generally in the order of several μ sec or less. When the exposure pulse width is controlled in units divided finer than a number of divided pulse widths, high-speed control must be performed in proportion to the number of divided pulse widths. As a result, circuit costs become high, and an unstable operation is performed. For this reason, the number of pulses cannot be set to be excessively large. For example, when the exposure pulse width is divided into 15 pulse widths, the exposure pulse width can be controlled in only 16 ways per pixel, and a 256-tone recording density cannot be expressed. In addition, since the relationship between an exposure pulse width and a recording density is actually nonlinear, if an exposure pulse width is divided into 256 parts, the recording density cannot be uniformly controlled by the 1/256-level step.

As a method of expressing satisfactory tone when the number of control levels (in this case, the number of divided exposure pulse widths) an error diffusion method is used. The error diffusion method, as is known well, uses human sight characteristics in which a sensitivity is low at a high resolution. According to this method, a quantizing error in a current pixel is distributed to adjacent pixels to reproduce a desired recording density in units of combinations of a plurality of pixels. This error diffusion is performed in the adder 2 based on the output from the error diffusion section 8.

Figure 22:
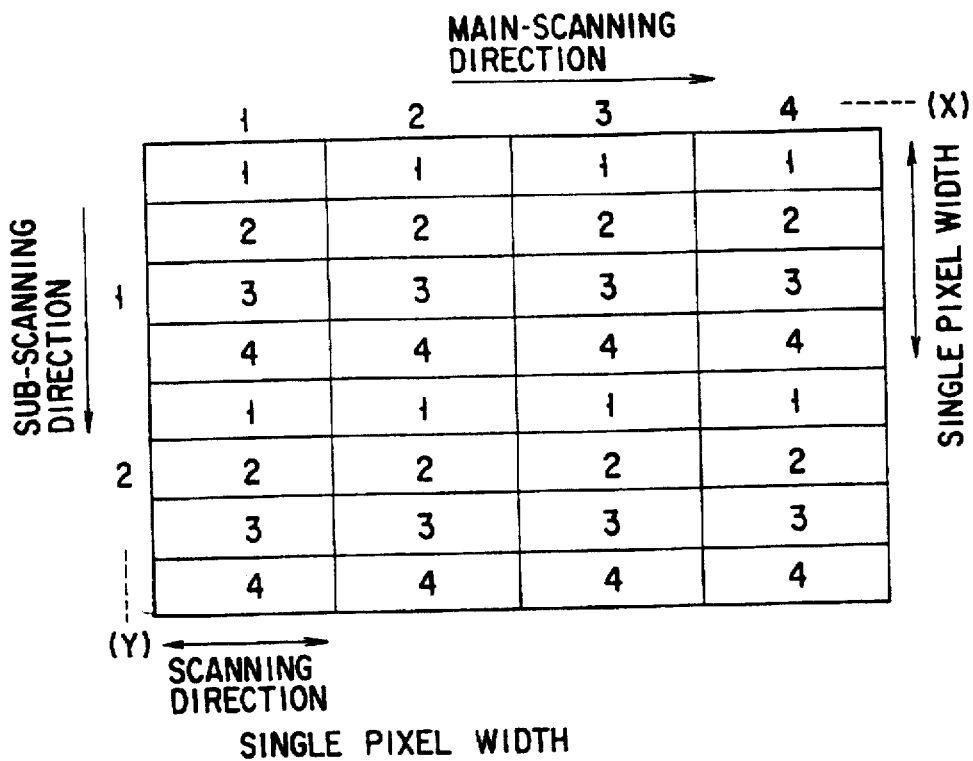
FIG. 22 is a view showing the pixel arrangement of an image on a recording paper in the second embodiment.

FIG. 22 shows the pixel arrangement of an image recorded on the recording paper 45 by the second signal conversion section 4. Referring to FIG. 22, the lateral direction denotes a main scanning direction (the arrangement direction of the solid state emission element array 22), and the vertical direction denotes a sub-scanning direction (the rotating direction of the photoreceptor drum 24=the feeding direction of the recording paper 45). Numbers respectively arranged in the main scanning direction and the sub-scanning direction denote pixel positions (X) and (Y) in the main scanning direction and the sub-scanning direction, numbers shown in areas obtained by dividing each pixel into a plurality of parts (four in FIG. 22) in the sub-scanning direction denote the positions of the areas.

In this case, a recording control signal output from the signal conversion section 3 makes the emission start timing of each of the odd-number (1, 3, ...) main scanning lines different from the emission start timing of the emission start timing of each of the even-number (2, 4, ...) main scanning lines. Recording width is increased in the odd-numberth main scanning lines by using an upper end portion of the pixel in FIG. 22 as a standard (to be referred to as a "front standard" hereinafter), and recording width is increased in the even-number main scanning lines using a lower end portion of the pixel in FIG. 22 as a standard (to be referred to as a "rear standard" hereinafter), when recording a tone image.

In this manner, multi-tone expression can be performed by controlling a recording width in a single pixel, and image dots are concentrically arranged in a low-density area by controlling a recording position, thereby stabilizing a density and reducing scattering noise.

Figure 23:
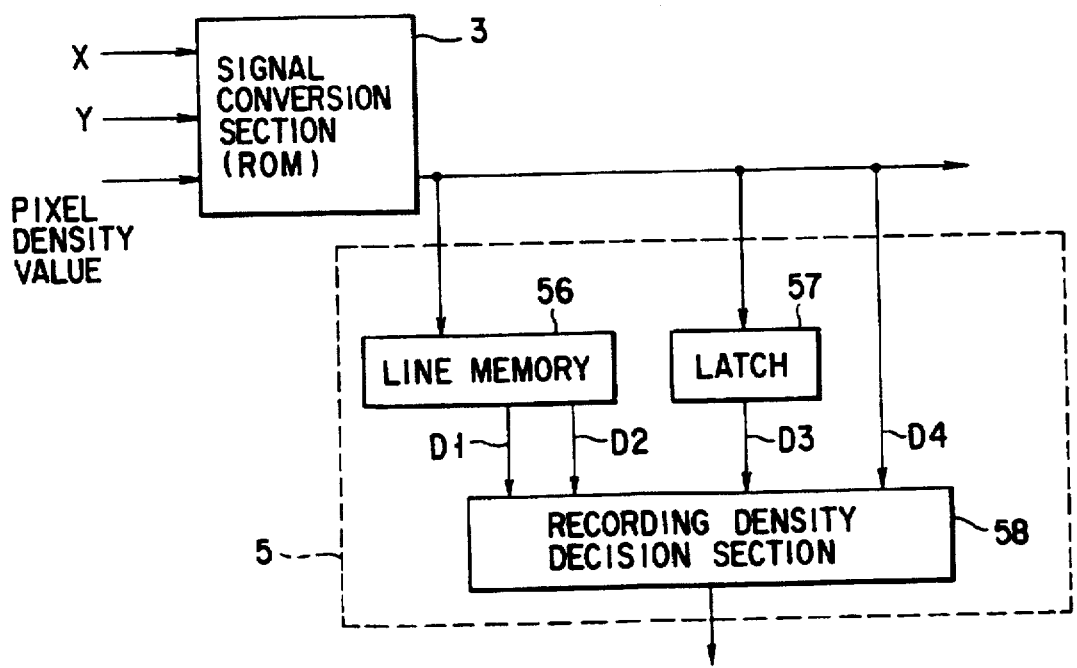
FIG. 23 is a block diagram showing the arrangement of a signal conversion section and a recording density estimate section in FIG. 19.

FIG. 23 shows the detailed arrangement of the signal conversion section 3 and the recording density estimate section 9 in FIG. 19.

The signal conversion section 3 can be realized by a ROM as shown in FIG. 23. In the ROM used in the signal conversion section 3, for example, a table shown in FIG. 24 is stored.

Referring to FIG. 24, a "pixel density value" is the pixel density value of each pixel of an image signal input from the image input section 1 to the signal conversion section 3 through the adder 2, and is a 256-level value. A "pixel position" represents X or Y in FIG. 22, only a pixel position Y in the sub-scanning direction is used in this case. An "output" is a recording control signal output from the signal conversion section 3. In the example shown in FIG. 24, the recording control signal corresponds to a pixel arrangement shown in FIG. 22 and is constituted by 3-bit recording width information (indicated by "width" in FIG. 24) representing recording widths, e.g., 0 to 4 and 2-bit recording position information (indicated by "position" in FIG. 24) representing recording positions 1 to 4. More specifically, the recording width information is information representing the number of areas, used in recording, of four areas in a single pixel in FIG. 22, and the recording position information is information representing an area, from which recording is started, of the four areas.

The recording density estimate section 9 will be described below.

The recording density estimate section 9 estimates a recording density in the recording section 5 based on a recording control signal output from the signal conversion section 3. In a general recording system such as an electrophotographic method in which a recording image is slightly blurred, the recording density of each pixel is influenced by adjacent pixels. For this reason, in the recording density estimate section 9, as shown in FIG. 23, the estimated recording density is determined based on data of four adjacent pixels of the recording control signal output from the ROM of the signal conversion section 3.

More specifically, the recording control signal is input to a line memory 56 and a latch 57 for delaying a single pixel. On the basis of a total of four data, i.e., two pixel data D1 and D2, extracted from the line memory 56, of the previous line of a main scanning line to which a current pixel belongs, previous pixel data D3 extracted from the latch 57, and current pixel data D4, the recording density decision section 58 calculates and determines the recording density of the current pixel.

The most accurate method of determining the recording density is as follows. That is, a recording experiment is performed where all combinations of the four pixels D1 to D4 is recorded, and the recording densities are measured based on the experiment result, and stored in the ROM. However, in this example, the recording control signal is expressed by 5 data bits per pixel. For this reason, when the data of the four pixels are used to determine the recording density, a combination of recording density data to be stored in the ROM has 20 bits, and the scale of the ROM increases. In this embodiment, since a single pixel is divided into four areas as shown in FIG. 22, a 16-bit combination can be obtained depending on consideration. However, the scale of the ROM is kept large.

According to a result obtained by actually performing a recording experiment, when the recording position (image dot position) of each pixel slightly changes, the recording density does not largely change. For this reason, the recording control signal is separated into recording width information and recording position information, the sum (corresponding to the sum of the densities of the four pixels) of the recording width information of the four pixel data D1 to D4 is calculated as the recording width information, and only information having 1 bit per pixel, i.e., information for distinguishing the front standard from the rear standard, is extracted, so that the sum of the recording width information of the four pixels is corrected as 4-pixel 4-bit information. In this case, the recording density can be accurately estimated.

Figure 25:
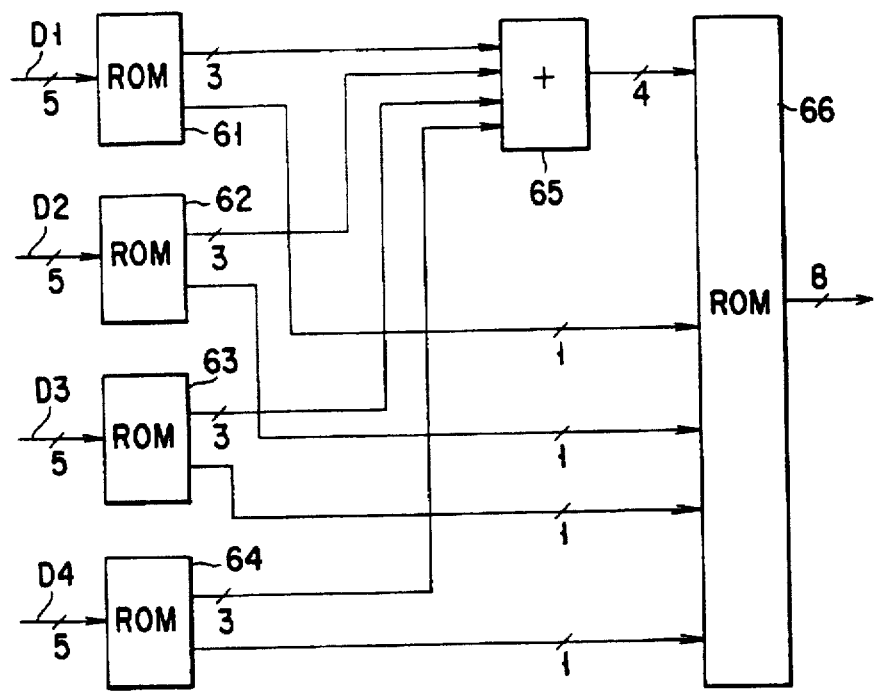
FIG. 25 is a block diagram showing the arrangement of a recording density decision section in FIG. 23.

FIG. 25 is a block diagram showing the arrangement of the recording density estimate section 9 simplified by the above method.

The four pixel data D1 to D4 (see FIG. 23) of the recording control signal are input to ROMs (may be logic circuits) 61 to 64 each having a 5-bit input, respectively. The 3-bit recording width information is separated from 1-bit data for distinguishing the front standard from the rear standard of the recording position information, and the 3-bit recording width information and the 1-bit data are extracted. Note that the 1-bit data of the recording position information to be output from the ROMs 61 to 64 can be obtained based on the information of "width" and "position" in FIG. 24. More specifically, when "position" is 1, the recording position information is set to be 1 regardless of "width"; when "position" is 2 and "width" is 1 or 2, the 1-bit data is set to be 1; when "position" is 3 and "width" is 1, the 1-bit data is set to be 0; when the sum of "position" and "width" is 5, the 1-bit data is set to be 0; and when "position" is 1 and the sum of "position" and "width" is 5, the 1-bit data is set to be 0 or 1.

4-bit data obtained by adding the 3-bit data of the recording width information to each other by an adder 65 and the 1-bit data of the recording position information of the four pixels are input to a ROM 66 having an 8-bit input, 8-bit recording density data is obtained by correcting the former data with the later data. The ROM 66 can be formed such that 16 levels are combined to the 16 combinations of the front and rear standards of the four pixels, i.e., the recording experiment is performed 256 times, to measure recording densities, and the measurement result is stored in the ROM 66. In fact, since the same recording density is obtained by symmetric combinations, the recording experiment need not be performed in all the combinations, and the recording experiment may be performed only 64 times, i.e., $256/4$.

This method can be applied to a case of a single pixel divided into 5 or more parts. For example, when the single pixel is divided into 8 parts, the reference of the recording position does not change, and the number of bits of the recording width information increases by 1. For this reason, a ROM having a 9-bit input may be used to determine a recording density. In addition, when a single pixel is divided into 9 parts, a ROM having a 10-bit input can be used. Therefore, when the estimate accuracy of the recording density is increased, hardware does not increase in scale.

An error between the density estimate value obtained in the recording density estimate section 9 as described above and a corrected pixel density value output from the adder 2 is calculated by the subtracter 7, and this error signal is diffused to pixels adjacent to an current pixel. The sum of the diffused values is added to the pixel density value of the next pixel by the adder. In the above error diffusion processing, when the error between a pixel density value and a recording density value occurs in a given pixel, the error is transferred to the pixels adjacent to the given pixel. For this reason, a recording density value and a pixel density in a macroscopic area can equally be reproduced in density.

An error generally occurs between a recording density estimate value and an actual recording density. This is because the number of control levels of a recording width (exposure pulse width) defined by a recording control signal is smaller than the number of required tone levels, and because the value of a recording control signal is not selected such that a recording density is close to an image density value. As will be described later, since the signal conversion section 3 outputs a recording control signal to increase the size of an image dot to some extent, a recording width for reproducing a recording density closest to the image density value is not necessarily selected. However, since the error between the recording density estimate value and an actual recording density is transferred to the next pixel by error diffusion, the recording density in a macroscopic area can be correctly reproduced.

As described above, according to this embodiment, fine pattern information, i.e., a recording width and a recording position, are determined in accordance with the pixel density values of input image signals in units of pixels. For this reason, the fine pattern information can sufficiently respond to a sharp change in image signal, and high-resolution image can be expressed.

On the other hand, since the recording density is estimated in consideration of the influence of adjacent pixels and a change in density depending on a position in one image dot, error diffusion can be performed by feeding back the recording density information at high accuracy, and a very accurate density can be expressed.

FIG. 26 shows another table stored in the ROM constituting the signal conversion section 3. Unlike the table in FIG. 24, in the table of FIG. 26, recording width information and a recording position information are changed by not only a pixel position Y in a sub-scanning direction but also a pixel position X in a main scanning direction. When the signal conversion section 3 is realized by a ROM in which the table shown in FIG. 24 is stored, an odd number series in which X is an odd number and an even number series in which X is an even number has the same recording width information and the same recording position information. As a result, the same arrangement of the fine patterns of the recording image is obtained. For this reason, when an half-tone having a uniform density is expressed, the recording image has a line-like pattern continuing in the main scanning direction, i.e., a pattern based on a lateral line.

Figures 27A, 27B, 27C, 27D:
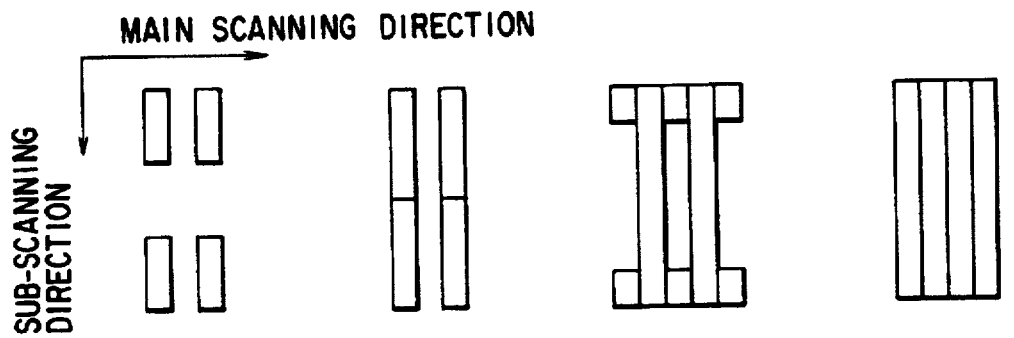
FIGS. 27A to 27D are views showing fine patterns based on vertical lines when the table shown in FIG. 26.

In contrast to this, when the ROM constituting the signal conversion section 3 stores a table in which an odd number series and an even number series have different recording width information and different recording position information as shown in FIG. 26, and the arrangements of the fine patterns of the recording image are different from each other, the recording image has a line-like pattern extending in the sub-scanning direction at a low density, and, at a high density, the recording image has a pattern obtained by connecting cross-shaped patterns to each other. More specifically, as shown in FIG. 27A, a line-like pattern slightly extending in the sub-scanning direction is obtained at a low density, and a line-like pattern continuing in the sub-scanning direction as shown in FIG. 27B, i.e., a pattern based on a vertical line, is obtained at an intermediate density.

In a so-called contact development system in which the photoreceptor drum 24 and a development roller 42a are in contact with each other as shown in FIG. 3, since the rotating cycles of the photoreceptor drum 24 and the development roller 42a are different from each other, toner supplied from the development roller 42a to the photoreceptor drum 24 is easily influenced by the development roller 42a, and fine patterns may be deformed and broken. However, as shown in FIG. 27B, in patterns continuing in a sub-scanning direction, i.e., a direction in which the development roller and the photoreceptor drum 24 are rubbed against each other, the fine patterns are slightly deformed and broken, recording having a low coarse noise level can be performed. As shown in FIG. 27C, a cross-like pattern is formed at an intermediate or more density. In this case, toner stably adheres to recording paper.

According to the above fine patterns, as in contact development using monocomponent non-magnetic toner, in a development system in which the photoreceptor drum 24 and the development roller 42a are in contact with each other, relatively stable tone rendition can be performed. In addition, the fine pattern is strong against a blur of recording image dots caused by eccentricity of the photoreceptor drum 24, and the fine pattern has a low coarse noise level as a characteristic feature. Note that when the pattern in FIG. 27B is changed into the pattern in FIG. 27C, a recording density tends to sharply increase. However, when the number of image dots is increased in the main scanning direction before the patterns are completely connected to each other in the sub-scanning direction, such a sharp increase in recording density can be moderated.

Figure 28:
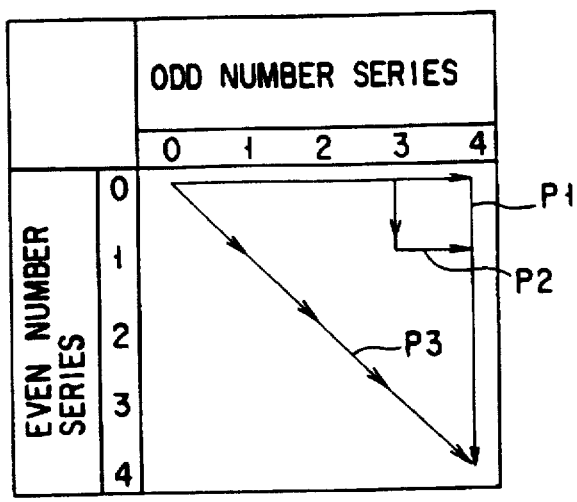
FIG. 28 is a graph for explaining various combinations of the fine patterns.

FIG. 28 shows various combinations of fine patterns of a recording image when the table in FIG. 26 is used. In FIG.

28, the relationships between image dot width of an even number series and an odd number series are dotted on the ordinate and the abscissa, respectively. According to a line figure indicated by P2 in FIG. 28, first, the odd number series records the recording width of three areas of the areas divided by 4 in the sub-scanning direction, and the even number series records the recording width of the remaining area. The odd number series records the recording width of one area again, and the even number series stores the recording width of one area. In this manner, a sharp change in tone can be reduced.

When the patterns completely continue in the sub-scanning direction as shown in FIGS. 27B to 27D, a line figure indicated by P1 in FIG. 28 is obtained. More specifically, the odd number series linearly records the recording width of four areas, and then the even number series records the recording width of the four areas until a solid density. P3 in FIG. 28 denotes an example wherein recording is performed by the table in FIG. 24.

In this manner, when recording levels of the odd number series and the even number series are combined with each other, various combinations of fine patterns can be obtained. For this reason, in accordance with the recording characteristics of pixel formation, a reduction in coarse noise and stability of tone characteristics can be designed.

Although an image recording apparatus for a monochrome image is described in this embodiment, the present invention can also be applied to a color image recording apparatus. In this case, a conspicuous effect can be obtained. In this case, a recording section records a color image using four inks, e.g., yellow (Y), magenta (M), cyan (C), black (K), recording control signals are respectively generated for these colors. When the positional shift of a color printer is small, i.e., about one image dot or one image dot or less, information representing "position" in the table shown in FIG. 24 or 26 is changed for each of the colors Y, M, C, and K, and stable color reproduction can be obtained. In the recording system of an actual color printer, a positional shift of about 1.5 pixels is frequently formed, and the color reproduction of an image actually recorded is determined by an average recording image dot position even if the colors are controlled at the same recording position. For this reason, a large change in color reproduction rarely occurs.

(Third Embodiment)

In this embodiment, with respect to a case wherein all an half-tone image, characters, a line image are processed as half-tone data and input, an example wherein the half-tone of the half-tone image is faithfully reproduced, and the characters and line image are reproduced while giving priority to their sharpness will be described.

Figure 29:
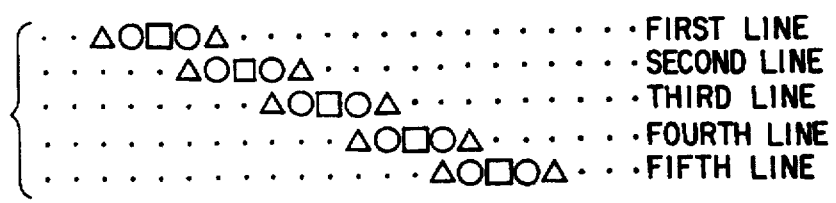
FIG. 29 is a view showing image dot data of a multi-leveled oblique line.

As an image signal source (i.e., output from an image input section 1), a printer controller output for directly outputting an output signal from a scanner or half-tone multi-level pixel data and generating bit-map pixel data for the code signals of the characters and line image is supposed. For example, when a line is obliquely recorded as shown in FIG. 29, an image signal source for generating half-tone data representing an area rate at each image dot is used. More specifically, referring to FIG. 29, ▲, ○, and □, denotes a printing rate, an intermediate printing rate, and a solid printing rate, respectively.

In this case, since an original image is a line figure, in order to sharply express the line, it is undesirable that recording widths are simply increased using front standards and rear standards in an odd number line and an even number line as in the second embodiment. For this reason, according to this embodiment, the patterns (types) of an input image signal are examined to check whether the patterns are part of a line image or patterns having sharpness which can be improved. If the patterns are the part of the line image or the patterns having sharpness which can be improved, the front and rear standards are determined such that the line image is more faithfully reproduced, more specifically, the line image is sharply reproduced. If the patterns are not the part of the line image or patterns having sharpness which cannot be improved, as in the second embodiment, the front and rear standards are determined by an odd number line and an even number line. More specifically, the recording position determined in the second embodiment is not changed.

Figure 30:
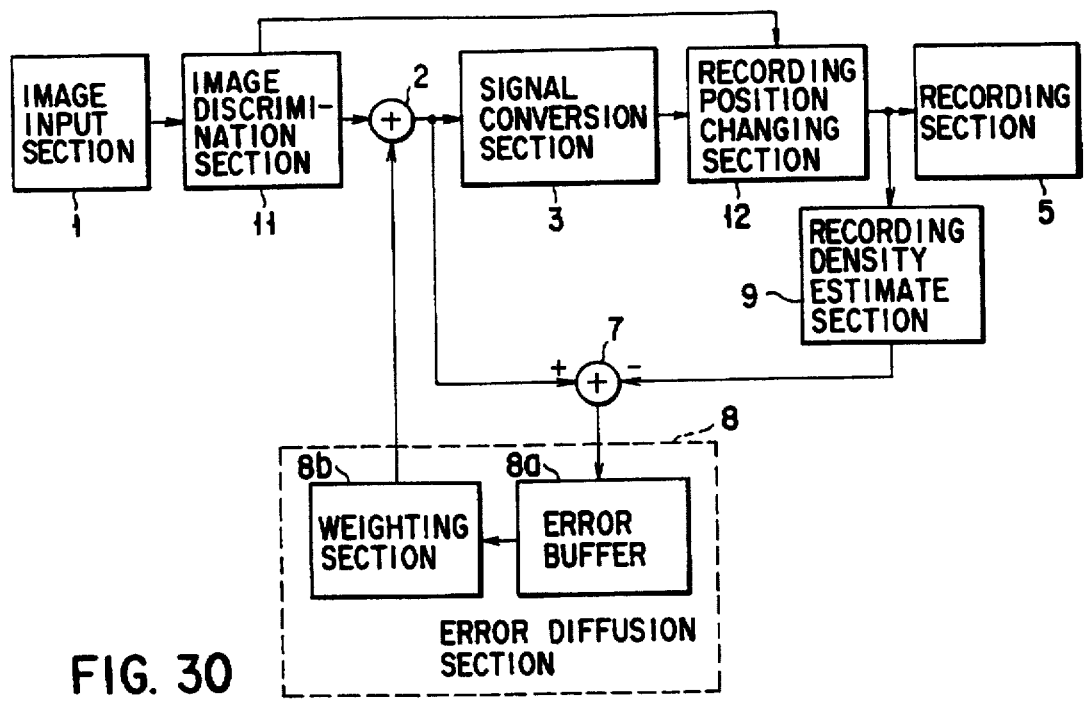
FIG. 30 is a block diagram showing the arrangement of an image recording apparatus according to the third embodiment of the present invention.

FIG. 30 is a block diagram showing the arrangement of an image recording apparatus according to this embodiment having the above function. The same reference numerals as in FIG. 19 denote the same parts in FIG. 30.

Referring to FIG. 30, an image discrimination section 11 for discriminating the type of an image signal from the image input section 1, and a recording position changing section 12 for changing recording position information of a recording control signal output from the signal conversion section 3 to change a recording position.

The image discrimination section 11 discriminates the type of the image signal from the image input section 1 based on the pattern of an image, and determines whether front standards or rear standards are used based on the discrimination result. More specifically, when the image discrimination section 11 determines the image signal is part of a line image or patterns having sharpness which can be improved, the contents of the recording position information of a quantized recording control signal output from the signal conversion section 3 are updated by the recording position changing section 12. When it is not determined that the image signal is the part of the line image or the patterns having sharpness which can be improved, such recording position information is not updated.

When the recording position changing section 12 updates the recording position information, a recording density estimate value output from the recording density estimate section 9 is corrected. More specifically, when the density of a recording image changes such that the sharpness of the recording image is enhanced, the recording position information of a recording control signal input from the signal conversion section 3 to the recording density estimate section 9 through the recording position changing section 12 changes. For this reason, an address value input to the ROM in FIG. 23 changes by the change in the recording position information, and the recording density estimate value is corrected, so that the recording density is totally kept by the loop of error diffusion.

Figure 31:
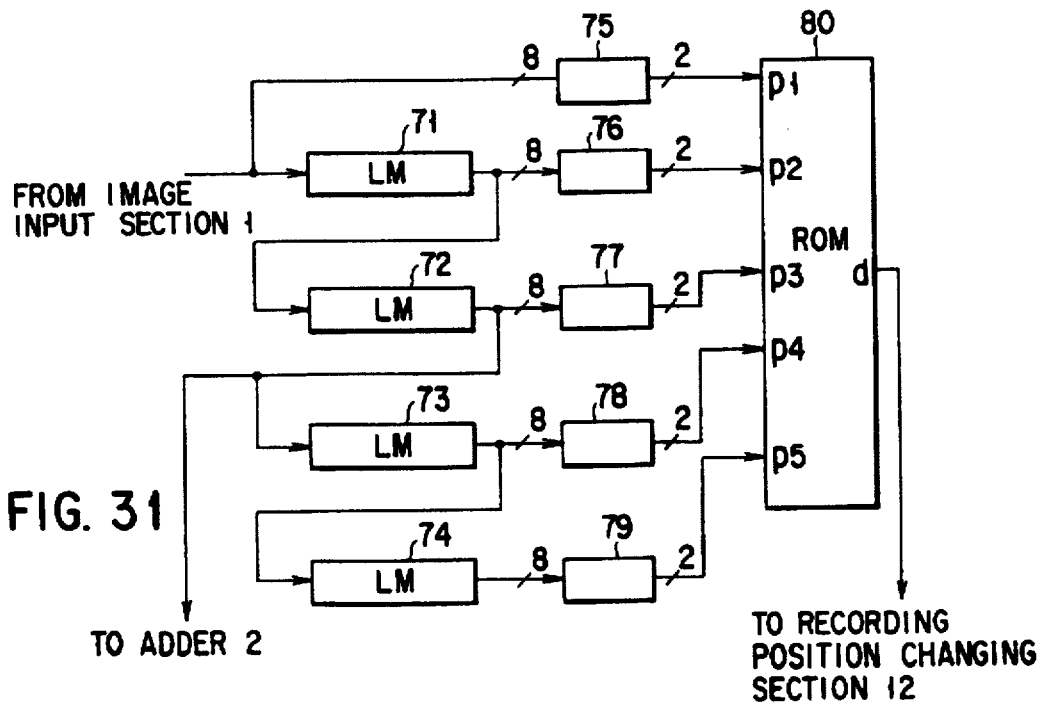
FIG. 31 is a block diagram showing the arrangement of an image discrimination section in FIG. 30.

FIG. 31 shows the detailed arrangement of the image discrimination section 11.

An image signal input from the image input section 1 is delayed by line memories 71, 72, 73, and 74, image data of first to fifth lines are parallel extracted. The delayed image data of the third line is also input to the adder 2. With respect to the image data of the first to fifth lines, a density 0 (x=0), an half-tone density (0<x <1), and a solid density (x=1) are decided by multi-level/bi-level decision circuits 75 to 79 each constituted by a ROM or a logic circuit. The image data are converted into 2-bit data. A sharpness enhanced decision ROM 80 decides whether sharpness can be enhanced based on the 2-bit data of the lines from the multi-level/bi-level decision circuits 75 to 79. If the sharpness can be enhanced, data of front and rear standards are output.

FIG. 32 is a table stored in the sharpness enhanced decision ROM 80, and shows the relationship between an input value p (p1 to p5) and an output value d. FIGS. 33A to 33H show manners in which recording positions are changed in three pixels or five pixels. Referring to FIGS. 33A to 33H, each broken line indicates a non-recording area, and each solid line indicates a recording area.

In the table in FIG. 32, only when an image signal has half-tone (p3=1), the recording position is changed. When the image signal is white or solid, the recording position must be the end portion of a pixel, and the recording position cannot be changed. In addition, when the image signal has half-tone near bi-level data and is white on the opposite side, the half-tone image signal is made close to the solid image signal because the recording position is an edge of a line. More specifically, when one of two adjacent image dots is solid, and the other is white, (in cases of a and b in FIG. 32, i.e., when p2=2 and p4=0, or when p4=2 and p2=0), in FIGS. 33A to 33D, a recording position is changed to a solid image dot side, e.g., from FIG. 33A to FIG. 33B, or from FIG. 33C to FIG. 33D. In this manner, the line is not blurred, a sharp edge can be obtained, and coarseness is reduced in an oblique line which is almost parallel to the main scanning direction.

Assume that one of the adjacent image dots has half-tone, that the other is white, and that image dots adjacent to both the sides of the adjacent image dots are white, i.e., assume that a fine line is scanned over two image dots, or that an image which is rasterized is used (cases of c and d in FIG. 32). In this case, the recording position is changed the line is made fine. More specifically, referring to FIGS. 33E to 33H, the recording position is changed from FIG. 33E to FIG. 33F or from FIG. 33G to FIG. 33H. In cases other than the above cases, the recording position is not changed. In this manner, coarseness of an oblique line can be reduced, and a sharper image can be reproduced.

Note that a change in recording position may be selected such that the reproduced image is sharpened and coarseness is reduced. This change is not limited to a change in recording position according to the table shown in FIG. 32. In addition, a sharpness enhanced decision section need not be constituted by a ROM, and it may be constituted by a logic circuit.

In this embodiment, the type of the image of an input image signal is directly decided based on the input image signal to decide the affectivity of a change in recording position. However, the type of the image of the input image signal is decided based on a recording control signal output from the signal conversion section 3, i.e., a quantized image signal, and a change in recording position may be performed based on the type. In this case, change processing for the recording position can be realized by the same arrangement as shown in FIG. 31. However, in this case, since only recording width information of the quantized recording control signal may be used in place of the input image signal from the image input section 1, the storage capacity of each of the line memories 71 to 74 may be small.

In this embodiment, processing in which a change in recording position is performed by the type (arrangement of image patterns) of an input image signal to obtain sharpness is described. However, after the well-known high-frequency enhancement is performed for the input image signal, when the processing according to this embodiment is performed, the processing is more effective. More specifically, the first, second and third embodiments are based on multi-level error diffusion. When such processing is performed, an image data is generally converted into a blurred image. However, when high-frequency enhancement is performed to correct the blurred image, a sharper image can be obtained. In this case, since the high-frequency enhancement is performed to check whether a change in recording position is required or not, an edge can be easily detected, and sharpness can be effectively enhanced.

(Fourth Embodiment)

Figure 34:
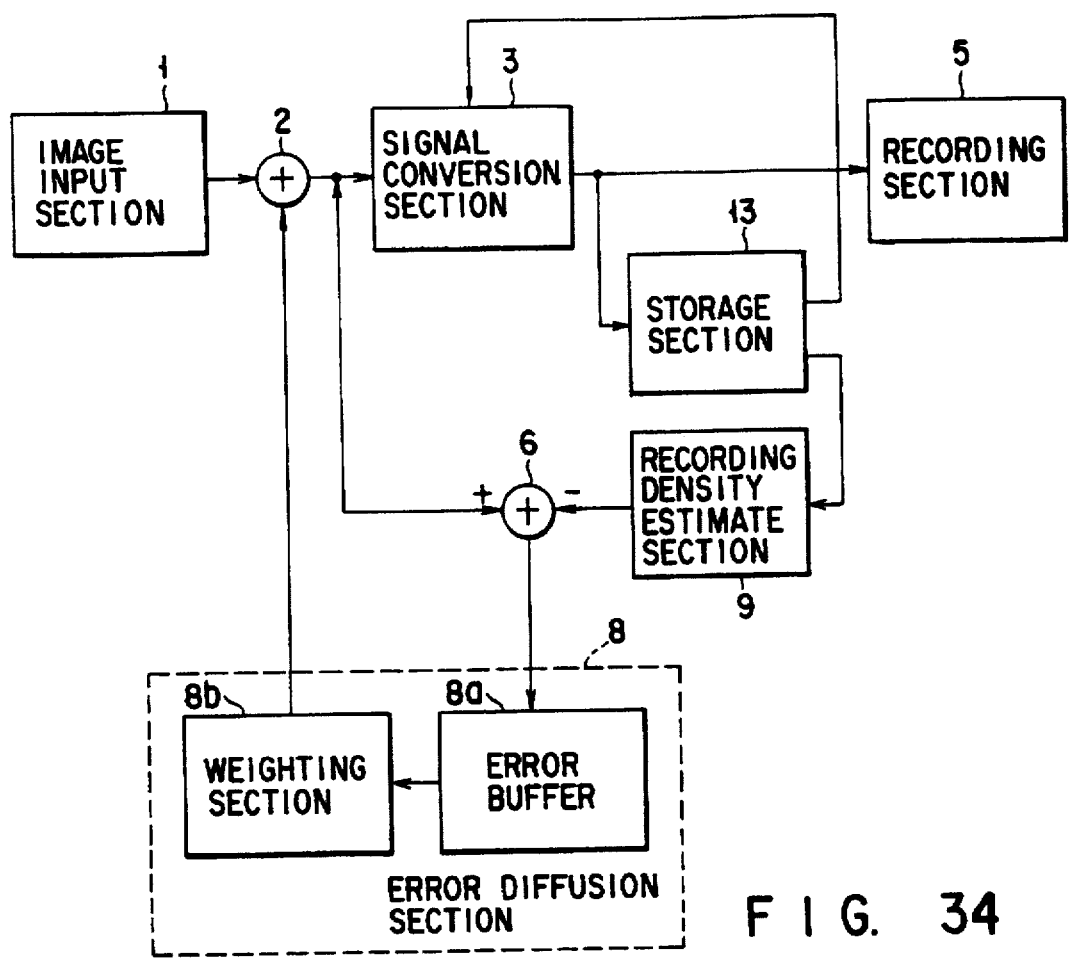
FIG. 34 is a block diagram showing the arrangement of an image recording apparatus according to the fourth embodiment of the present invention.

FIG. 34 is a block diagram showing the arrangement of an image recording apparatus according to the fourth embodiment. This embodiment is obtained by adding a storage section 13 to the arrangement of the third embodiment in FIG. 19. The storage section 13 is constituted by a line memory, and stores 1-line recording control signal output from a signal conversion section 3. An output from the storage section 13 is input to the signal conversion section 3 and a recording density estimate section 9.

In this case, the signal conversion section 3 determines the recording control signal of a current pixel with reference to the recording control signal of a pixel previously converted output from the storage section 13. The detailed method of deciding the recording control signal will be described later. The recording control signal decided as described above serves as an output signal from the signal conversion section 3, and is stored in the storage section 13.

The recording density estimate section 9 estimates a recording density in the current pixel based on the combination of recording control signals near the current pixel and outputs a recording density estimate value.

The recording density estimate value output from the recording density estimate section 9 subtracts from a corrected pixel density value output from an adder 2 by a subtracter 7, thereby generating an error signal. When the error signal is input to an error diffusion section 8, error diffusion is performed for an image signal from the image input section 1.

Figure 35A:
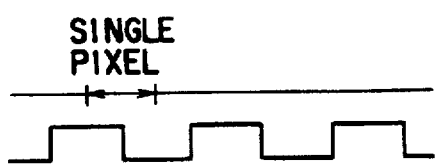
FIGS. 35A and 35B are views showing the distributions of the recording control signal of peripheral pixels of an current pixel in the fourth embodiment.
Figure 35B:
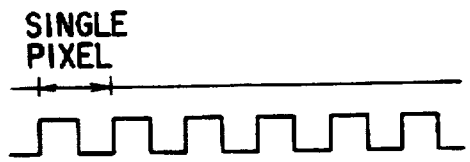
Figure 36A:
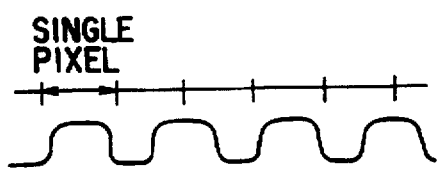
FIGS. 36A and 36B are views showing the exposure distributions on a photoreceptor drum corresponding to the distributions in FIGS. 35A and 35B.
Figure 36B:
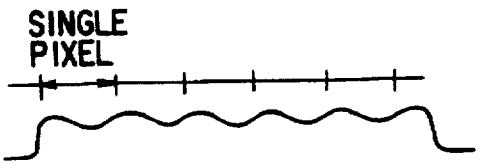

The recording density estimate section 9 in this embodiment estimates a recording density near the current pixel based on a combination of recording control signals of the current pixel and the pixel near the current pixel stored in the storage section 13 constituted by a line memory. This is because a recording width (exposure pulse width) defined by the recording control signal is not necessarily in proportion to a recording density, and the recording density also changes depending on the positional relationship of an exposure pulse. For example, the recording control signals (exposure pulses) of pixels around the current pixel have the distributions shown in FIGS. 35A and 35B, light distributions on the photoreceptor drum 24 shown in FIGS. 36A and 36B are obtained. When a potential distribution and a toner amount distribution are calculated by the distributions shown in FIGS. 36A and 36B, the recording density can be estimated. Since the relationship between an exposure and an amount of toner to be developed has nonlinear characteristics as shown in FIG. 6. For this reason, even if the same exposure pulse width having a duty ratio of 50% is used as in FIGS. 35A and 35B, when exposure pulse start times are different from each other, different recording densities may be obtained.

This embodiment is characterized in that the image dots of a recording image are controlled in size. The image dot means connected areas which toner adheres on the photoreceptor drum 24. As described above, when an exposure pulse width is small, an area having an intermediate potential increases on the photoreceptor drum 24, density stability is degraded, or coarse noise increases. Therefore, to prevent these drawbacks, the boundary between the ON/OFF states of the exposure control signal is preferably designed to decrease. However, the boundary is made excessively large, graininess becomes strong, image quality is degraded. For this reason, the boundary must be controlled to have a proper value.

In particular, although the rate of an image dot area must be made small with respect to the entire area of a low-density area, when one image dot is decreased in size, an exposure decreases, and density stability is considerably degraded. For this reason, even if graininess is conspicuous in the low-density area, an interval between image dots must be increased, and the image dot must be controlled not to have an excessively small size.

Figure 37:
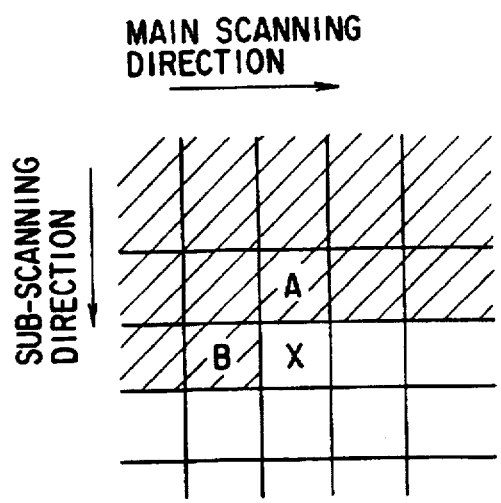
FIG. 37 is a view for explaining a method of deciding the recording control signal of an current pixel in a signal conversion section in FIG. 34.

As described above, in order to prevent the recording width, i.e., the size of the image dot, from being made excessively small, in this embodiment, the signal conversion section 3 determines the recording control signal of a current pixel with reference to the recording control signals of the current pixel and peripheral pixels which are determined in advance. FIG. 37 shows a reference range used when the signal conversion section 3 determines the recording control signal of the current pixel. Referring to FIG. 37, reference symbol X denotes the current pixel. The hatched portion indicates pixels in which the recording control signals are determined, and the recording control signals of these pixels are stored in the storage section 13. In this embodiment, the recording control signal of the current pixel X is determined based on the recording control signal of the pixel adjacent to the current pixel X on the upper side, the recording control signal of the pixel adjacent to the current pixel X on the left side, and the recording density value of the current pixel X. The procedures for determining the recording control signal will be described below.

Figure 38:
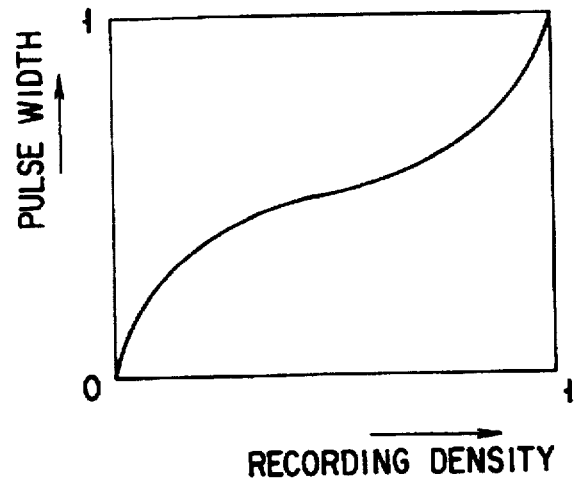
FIG. 38 is a graph showing the relationship between a recording density and an exposure pulse width on a photoreceptor drum.

Provisional recording width information of the recording control signal, i.e., exposure pulse width T, is determined based on the recording density value of the current pixel X. The exposure pulse width T may be simply obtained by proportional calculation. However, in this embodiment, in consideration of the characteristics of the recording system, the exposure pulse width T is obtained by using the nonlinear relationship between the recording density and the exposure pulse width on the photoreceptor drum shown in FIG. 38.

As shown in Table 1, the recording control signal of the current pixel X is determined by the recording control signals of pixels A and B adjacent to the current pixel X. Table 1 shows the recording control signal of the current pixel X for 16 combinations of the recording control signals (recording width information=pulse width and recording position information=pulse position) of the adjacent pixels A and B. The 16 recording patterns corresponding to the Table 1 are shown in FIGS. 39A to 39P. Referring to FIGS. 39A to 39P, as in FIG. 37, a lateral direction indicates a main scanning direction, and a vertical direction indicates a sub-scanning direction, each lower right pixel indicates the current pixel X having a recording control signal to be determined, and the upper and left pixels of each current pixel X respectively indicate the adjacent pixels A and B to be referred to. The hatched portions in the adjacent pixels A and B indicate the recording width information and recording position information of the recording control signal of the current pixel X.

TABLE 1

| | Pixel B | | Pixel A | | Current Pixel | |
|---|---|---|---|---|---|---|
| | Pulse Width Tb | Pulse Position | Pulse Width Ta | Pulse position | Pulse Width Tx | Pulse Position |
| 1 | 0 | * | 0 | * | h(T) | Rear |
| 2 | 0 < Tb < 1 | Front | 0 | * | h(T) | Rear |
| 3 | 0 < Tb < 1 | Rear | 0 | * | g(T) | Front |
| 4 | 1 | * | 0 | * | T | Front |
| 5 | 0 | * | 0 < Ta < 1 | Front | f(T) | Front |
| 6 | 0 < Tb < 1 | Front | 0 < Ta < 1 | Front | f(T) | Front |
| 7 | 0 < Tb < 1 | Rear | 0 < Ta < 1 | Front | T | Front |
| 8 | 1 | * | 0 < Ta < 1 | Front | T | Front |
| 9 | 0 | * | 0 < Ta < 1 | Rear | f(T) | Rear |
| 10 | 0 < Tb < 1 | Front | 0 < Ta < 1 | Rear | f(T) | Rear |
| 11 | 0 < Tb < 1 | Rear | 0 < Ta < 1 | Rear | f(T) | Rear |
| 12 | 1 | * | 0 < Ta < 1 | Rear | f(T) | Rear |
| 13 | 0 | * | 1 | * | T | Rear |
| 14 | 0 < Tb < 1 | Front | 1 | * | T | Rear |
| 15 | 0 < Tb < 1 | Rear | 1 | * | T | Front |
| 16 | 1 | * | 1 | * | T | Front |

Where, functions f(T), g(T) and h(T) are respectively $f(T) = T(T \geq 0.5)$ or $0(T < 0.5)$ $g(T) = 0.5(T < 0.5)$ or $T(T \geq 0.5)$ Methods of considering a rule for determining the recording control signal shown in Table 1 will be described below. In this case, the rule is based on the following methods.

First, when a pixel in contact with the adjacent pixel of current pixel X has no image dot, or when a pixel adjacent to the current pixel X on the left side, and when the upper portion of the pixel adjacent to the current pixel X on the upper side, the current pixel X easily becomes an isolated point. For this reason, in order to prevent this, the exposure pulse width is made smaller than the original exposure pulse width, and the exposure pulse position is set backward. In this case, since the recording density of the current pixel X becomes smaller than an original calculation value, a large image dot is easily recorded on the adjacent pixel because of the effect of error diffusion processing. For this reason, a small image dot is not easily formed.

Second, when the pixel adjacent to the current pixel X on the left side has an image dot, a pulse position is determined to be connected to the image dot. More specifically, the exposure pulse position of the current pixel X is matched with the exposure position of the pixel adjacent to the current pixel X on the left side. However, when the exposure pulse width is small, the current pixel X is almost isolated. For this reason, an exposure pulse which is large to some extent cannot be obtained, the exposure pulse width is increased or set to be 0.

Third, when the lower portion of the pixel adjacent to the current pixel X on the upper side has an image dot, the image dot of the current pixel X is arranged forward to be connected to the image dot of the adjacent dot. In this case, as the image dot is large, stability can be obtained. For this reason, the exposure pulse width is made larger than the original value.

In fact, since these three conditions are not exclusive, conditions are obtained by combining these conditions to each other. In this case, one of these conditions is selected with reference to the shapes of patterns obtained under these conditions.

FIGS. 40A to 40C show detailed processing performed in the signal conversion section 3. The meanings of the arrangement of pixels and a hatched portion in FIGS. 40A to 40C are the same as those in FIGS. 39A to 39P. The hatched portion in the current pixel X indicates the recording width and recording position of the determined recording control signal.

FIG. 40A shows a case wherein the two pixels A and B adjacent to the current pixel X on the upper and left sides have no image dot, i.e., a case wherein both the recording control signals of the current pixel X are 0 and the provisional value of the exposure pulse width T of the current pixel X is given by T=0.7. In this case, according to condition 1, the recording control signal of the current pixel X has a lower exposure pulse position and an exposure pulse width of 0.2. When no image dot is formed in the pixels A and B adjacent to the current pixel X on the upper and lower sides, an image dot is formed at the lower portion in the current pixel X. For this reason, the interval between the image dots increases, the image dots increase in size by a density keeping mechanism obtained by error diffusion processing, and an isolated dot is not easily formed.

FIG. 40B shows a case wherein the pixel B adjacent to the current pixel X on the left side has an image dot and the pixel A adjacent to the current pixel X on the upper side has no image dot, and the provisional value of the pulse width of the current pixel X is 0.5. In this case, according to condition 5, the recording control signal of the current pixel X has an upper exposure pulse position and an exposure pulse width of 0.5. Therefore, the image dot of the current pixel X is connected to the image dot of the adjacent pixel on the left side, and the image dot is prevented from being isolated.

FIG. 40C shows a case wherein the pixel A adjacent to the current pixel X on the upper side has an image dot and the pixel B adjacent to the current pixel X on the left side has no image dot, and the provisional value of the pulse width of the current pixel X is 0.3. In this case, according to condition 3, the recording control signal of the current pixel X has an upper exposure pulse position and an exposure pulse width of 0.5. Therefore, the image dot of the current pixel X is connected to the image dot of the adjacent pixel on the upper side, and the image dot is prevented from being isolated.

As described above, according to this embodiment, the recording control signal of the current pixel X is determined based on the image dots of the pixels A and B adjacent to the current pixel X and the positions of the image dots, so that connection between the image dots can be controlled. Therefore, the intermediate-potential area, in which a recording density easily becomes unstable during development, on the photoreceptor drum can be decreased.

Note that, in this embodiment, the two pixels adjacent to the current pixel X are used as reference pixels used for determining the recording control signal of the current pixel X. However, when the number of reference pixels is increased, the size of the image dot of the current pixel X can be controlled at higher accuracy.

As described above, according to this embodiment, when the recording control signal is to be determined, the recording control signals of the peripheral pixels around the current pixel X are also referred to. For this reason, the image dot of the current pixel X can be controlled to have a proper size. Therefore, an image having low graininess can be recorded while keeping density stability high.

(Fifth Embodiment)

In this embodiment, a case wherein a scanning optical system constituted by a laser is used in exposure of a photoreceptor drum in place of the scanning system constituted by the solid state emission element array in the second to fourth embodiments as in the first embodiment will be described below.

Figure 41:
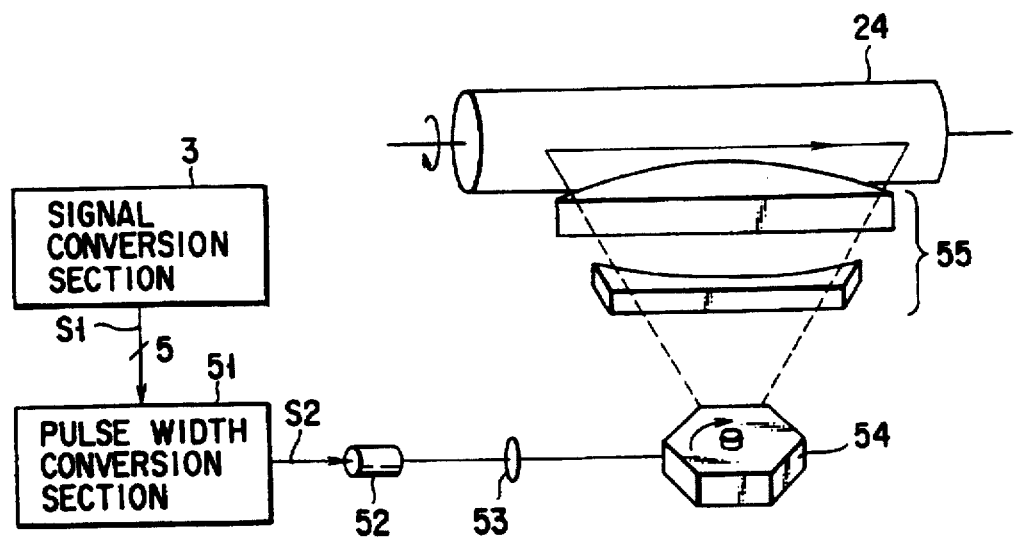
FIG. 41 is a view showing the arrangement of an image recording apparatus according to the fifth embodiment of the present invention.

Although FIG. 41 overlaps FIG. 7, FIG. 41 shows the arrangement of a recording section in an image recording apparatus according to this embodiment.

Referring to FIG. 41, a recording control signal S1 output from a signal conversion section 3 is input to a pulse width conversion section 51. The pulse width conversion section 51 converts the recording control signal S1 consisting of recording width information and recording position information which are expressed by a digital signal into an exposure control signal S2 having a pulse width according to the value of control signal S1. This exposure control signal S2 controls the emission start time and emission time of exposure light irradiated on a photoreceptor drum. In this embodiment, the recording control signal S1 is set to be a 5-bit signal. Four bits among the five bits are used as emission time control bits, and the remaining bit is used as an emission start time control bit. The four emission time control bits indicate a hexadecimal number. When this value is x, the emission time is given by $a \cdot x/15$. In this case, reference symbol a denotes the time width of a single pixel. In addition, "0" of one emission start time control bit means that emission is started at the beginning of the single pixel, and "1" means that emission is ended at the end of the single pixel.

FIGS. 42A to 42C show actual signal conversion in the pulse width conversion section 51. FIG. 42A shows the emission start time control bit, and FIG. 42B shows the emission time control bits, and FIG. 42C shows the exposure control signal S2. In the first pixel, since the value of the emission time control bits in FIG. 42B is set to be "15", the exposure recording control signal in FIG. 42C is set to be 1. In the second pixel, the value of the emission time control bits in FIG. 42B is set to be "7", and the value of the emission start time control bit in FIG. 42A is set to be "1". For this reason, the value of the exposure recording control signal in FIG. 42C is set to be "1" during the final $7/15$ period of the single pixel.

The exposure control signal S2 output from the pulse width conversion section 51 as described above is input to a laser diode 52, and light emitted from the laser diode 52 is ON/OFF-controlled. The light emitted from the laser diode 52 passes through a condensing lens 53 and is reflected from a polygon mirror 54, and then focused on a photoreceptor drum 24 by an imaging optical system 55 including an optical lens, thereby forming an electrostatic latent image on the surface of the photoreceptor drum 24. Since the polygon mirror 54 is rotated, its focusing point moves parallel to the shaft of the photoreceptor drum 24. In this case, an f-θ lens system is used in the imaging optical system 55 such that light is focused on any position of the shaft of the photoreceptor drum 24.

The surface of the photoreceptor drum 24 consists of a photosensitive material, and is uniformly charged by a charger (not shown) before exposure. When light is irradiated on the surface of the photoreceptor drum 24, charges of the opposite polarity are generated at the point at which the light is irradiated, and charge potentials are canceled to form a potential distribution according to an exposure as an electrostatic latent image. The relationship between the exposure and surface potential of the photoreceptor drum 24 are the same as those shown in, e.g., FIG. 4.

Emission of the laser diode 52 is controlled by the exposure control signal S2. In this case, the length of one raster of the exposure control signal S2 is synchronized with the rotation of the polygon mirror 54, and the raster interval of the exposure control signal S2 is matched with the rotating speed of the photoreceptor drum 24, thereby forming an electrostatic latent image corresponding to an input image signal.

Next, a development roller causes toner according to the electrostatic potential on the photoreceptor drum 24 to adhere to the photoreceptor drum 24, and the toner is transferred to and fixed on recording paper, thereby forming an image on the recording paper. Since the arrangement of a development system is the same as that in FIG. 3, a detailed description thereof will be omitted.

At this time, FIG. 43B shows an exposure distribution on the photoreceptor drum 24 obtained when the exposure control signal S2 shown in FIG. 43A is given. Referring to FIG. 43B, each hatched area indicates an exposed portion. This area has a shape obtained by superposing the spot shape of light on the exposure control signal in FIG. 43A.

The laser diode 52 is not a spot light source, and a blur is caused by the imaging optical system. For this reason, an exposure moderately change in the boundary between the exposed portion and the non-exposed portion. As a result, an exposure distribution on a line A—A' in FIG. 43B is the same as that in FIG. 43C. An intermediate-exposure area is near the boundary. Especially, in a portion where exposure light is frequently turned on/off, the intermediate-exposure area is increased.

In the second to fourth embodiments, the modulation direction of a recording width is a main scanning direction (direction parallel to the rotating shaft of the photoreceptor drum). However, in this embodiment, the modulation direction is parallel to a sub-scanning direction (rotating direction of the photoreceptor drum 24). For this reason, the signal conversion section 3 outputs a recording control signal suitable for the modulation direction. More specifically, although the signal conversion section 3 of this embodiment is basically the same as that of each of the second to fourth embodiments, a method of determining a control signal in this embodiment is different from that in each of the second to fourth embodiments.

Table 2 shows a method of determining a recording control signal in the signal conversion section 3. Table 2 is obtained by exchanging the positions of the adjacent pixels A and B in the method of determining a recording control signal in the fourth embodiment shown in Table 1. shown in Table 1.

TABLE 2

| | Pixel B | | Pixel A | | Current Pixel | |
|---|---|---|---|---|---|---|
| | Pulse Width Ta | Pulse Position | Pulse Width Tb | Pulse position | Pulse Width Tx | Pulse Position |
| 1 | 0 | * | 0 | * | h(T) | Rear |
| 2 | 0 < Ta < 1 | Front | 0 | * | h(T) | Rear |
| 3 | 0 < Ta < 1 | Rear | 0 | * | g(T) | Front |
| 4 | 1 | * | 0 | * | T | Front |
| 5 | 0 | * | 0 < Tb < 1 | Front | f(T) | Front |
| 6 | 0 < Ta < 1 | Front | 0 < Tb < 1 | Front | f(T) | Front |
| 7 | 0 < Ta < 1 | Rear | 0 < Tb < 1 | Front | T | Front |
| 8 | 1 | * | 0 < Tb < 1 | Front | T | Front |
| 9 | 0 | * | 0 < Tb < 1 | Rear | f(T) | Rear |
| 10 | 0 < Ta < 1 | Front | 0 < Tb < 1 | Rear | f(T) | Rear |
| 11 | 0 < Ta < 1 | Rear | 0 < Tb < 1 | Rear | f(T) | Rear |
| 12 | 1 | * | 0 < Tb < 1 | Rear | f(T) | Rear |
| 13 | 0 | * | 1 | * | T | Rear |
| 14 | 0 < Ta < 1 | Front | 1 | * | T | Rear |
| 15 | 0 < Ta < 1 | Rear | 1 | * | T | Front |
| 16 | 1 | * | 1 | * | T | Front |

Where, functions f(T), g(T) and h(T) are respectively $f(T)=T(T>=0.5)$ or $0(T<0.5)$ $g(T)=0.5(T<0.5)$ or $T(T>=0.5)$ As described above, according to this embodiment, when a scanning optical system using a laser is used in an exposure system, an image dot can be controlled to have a proper size as in the fourth embodiment. For this reason, the same effect as that of the fourth embodiment, i.e., an effect that an image having low graininess can be recorded while keeping density stability high, can be obtained.

Note that each of the third to fifth embodiments can be applied to a color image recording apparatus like the second embodiment as a matter of course.

In addition, the recording density estimate section 9 or the like used in the second to fourth embodiments can be applied to the first embodiment.

The present invention is not limited to the above embodiment of the present invention, and various changes and modifications of the present invention can be effected without departing from the scope of the present invention.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended general inventive concept as defined by the appended claims and their equivalents.

What is claimed is:

1. An image recording apparatus comprising:

first signal conversion means for converting a pixel density value of a current pixel of an input image signal into a first recording control signal for defining a recording amount;

second signal conversion means for converting the first recording control signal into a second recording control signal by referring to a selected adjacent pixel recording control signal for defining a recording amount of at least one adjacent pixel connected to said current pixel, wherein reference to the selected adjacent pixel control signal places said second recording control signal closest to the first recording control signal, and said second recording control signal defines a recording amount at which pixel formation for said current pixel is stabilized;

recording means for recording an image based on the second recording control signal; and error diffusion means for diffusing an error between the pixel density value and a recording density value of the second recording control signal to a pixel density value of each pixel of said input image signal subsequent to said current pixel and located around said current pixel.

2. An image recording apparatus according to claim 1, further comprising recording density estimate means for estimating a recording density in said recording means based on a recording control signal used in recording performed by said recording means to output a recording density estimate value.

3. An image recording apparatus comprising:

first signal conversion means for converting a pixel density value of a current pixel of an input image signal into a first recording control signal for defining a recording amount consisting of at least a recording width;

second signal conversion means for converting the first recording control signal into a second recording control signal by referring to a selected adjacent pixel recording control signal for defining a recording amount of at least one adjacent pixel processed in advance and connected to said current pixel, wherein the selected adjacent pixel recording control signal places said second recording control signal closest to the first recording control signal, and said second recording control signal defines a recording amount consisting of a recording width and a recording position at which pixel formation for said current pixel is stabilized;

recording means for recording an image based on the second recording control signal; and error diffusion means for diffusing an error between the pixel density value and a recording density value calculated based on the recording amount of the second recording control signal to a pixel density value of each pixel of said input image signal subsequent to said current pixel and located around said current pixel.

4. An image recording apparatus according to claim 3, wherein said second signal conversion means refers to the adjacent-pixel recording control signal of a previous pixel to said current pixel.

5. An image recording apparatus according to claim 3, further comprising recording density estimate means for estimating a recording density in said recording means based on a recording control signal used in recording performed by said recording means to output a recording density estimate value.

6. An image recording apparatus comprising:

signal conversion means for converting a pixel density value of a current pixel of an input image signal into a recording control signal;

recording means for recording an image based on the recording control signal; and error diffusion means for diffusing an error between the pixel density value and a recording density value based on the recording control signal to a pixel density value of each pixel of said input image signal subsequent to said current pixel and located around said current pixel, wherein said signal conversion means converts the pixel density value of said current pixel into a recording control signal for defining a recording width and a recording position such that at least one of a recording pattern and a non-recording pattern corresponding to said current pixel and a peripheral pixel connected to said current pixel reach a predetermined continuous value.

7. An image recording apparatus according to claim 6, further comprising recording density estimate means for estimating a recording density in said recording means based on a recording control signal used in recording performed by said recording means to output a recording density estimate value.

8. An image recording apparatus comprising:

signal conversion means for converting a pixel density value of a current pixel of an input image signal into a recording control signal for defining a recording width and a recording position of said current pixel by referring to a recording control signal obtained by converting a selected pixel density value of a peripheral pixel around said current pixel to convert the pixel density value of said current pixel into the recording control signal for stably recording said current pixel;

recording means for recording an image based on the recording control signal;

recording density estimate means for estimating a recording density in said recording means based on the recording control signal to output a recording density estimate value to a pixel density value of each pixel located around the current pixel; and error diffusion means for diffusing an error between the pixel density value and the recording density estimate value.

9. An image recording apparatus according to claim 8, wherein said recording density estimate means includes means for referring to a recording control signal obtained by converting a pixel density value of a peripheral pixel around said current pixel to estimate a recording density of said current pixel.

10. An image recording apparatus according to claim 8, wherein said recording density estimate means includes means for referring to a recording control signal obtained by converting the pixel density value of said peripheral pixel of said current pixel to estimate a recording density of said pixel.

11. An image recording apparatus according to claim 8, further comprising:

image determining means for determining a type of the image signal based on one of the image signal and a signal obtained by quantizing the image signal; and change means for changing a recording position defined by the recording control signal based on a determination result of said image determining means.

12. An image recording apparatus according to claim 11, wherein said recording density estimate means includes means for referring to a recording control signal obtained by converting a pixel density value of a peripheral pixel around said current pixel to estimate a recording density of said current pixel.

13. An image recording apparatus according to claim 11, wherein said signal conversion means includes means for referring to a recording control signal obtained by converting a pixel density value of a peripheral pixel around said current pixel to convert the pixel density value of said current pixel into the recording control signal.

14. An image recording apparatus according to claim 13, wherein said recording density estimate means includes means for referring to a recording control signal obtained by converting a pixel density value of a peripheral pixel around said current pixel to estimate a recording density of said current pixel.

15. An image recording method comprising the steps of:

converting a pixel density value of a current pixel of an input image signal into a first recording control signal for defining a recording amount;

referring to an adjacent pixel recording control signal for defining a recording amount of at least one adjacent pixel connected to said current pixel to convert the first recording control signal into a second recording control signal, the adjacent pixel recording control signal having been selected to place said second recording control signal closest to the first recording control signal, and said second recording control signal defines a recording amount at which pixel formation for said current pixel is stabilized;

recording an image based on the second recording control signal; and diffusing an error between the pixel density value and a recording density value of the second recording control signal to a pixel density value of each pixel of said input image signal subsequent to said current pixel and located around said current pixel.

16. An image recording method comprising the steps of:

converting a pixel density value of a current pixel of an input image signal into a recording control signal for defining a recording width and a recording position of said current pixel;

recording an image based on the recording control signal;

estimating a recording density based on the recording control signal to output a recording density estimate value by referring to a recording control signal obtained by converting a pixel density value of a peripheral pixel around said current pixel; and diffusing an error between the pixel density value and the recording density estimate value to a pixel density value of each of pixel located around the current pixel.

* * * * *